(12) United States Patent
Chen

(10) Patent No.: US 12,277,431 B2
(45) Date of Patent: Apr. 15, 2025

(54) DATA BUFFERING METHOD, DATA PROCESSING METHOD, COMPUTER DEVICE, STORAGE MEDIUM

(71) Applicant: Alibaba Group Holding Limited, Grand Cayman (KY)

(72) Inventor: Jing Chen, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 588 days.

(21) Appl. No.: 17/100,548

(22) Filed: Nov. 20, 2020

(65) Prior Publication Data

US 2021/0103459 A1 Apr. 8, 2021

Related U.S. Application Data

(63) Continuation of application No. PCT/CN2019/087799, filed on May 21, 2019.

(30) Foreign Application Priority Data

May 30, 2018 (CN) .......................... 201810539153.1

(51) Int. Cl.
*G06F 9/455* (2018.01)
*G06F 9/54* (2006.01)

(52) U.S. Cl.
CPC .......... *G06F 9/45558* (2013.01); *G06F 9/544* (2013.01); *G06F 2009/45579* (2013.01);
(Continued)

(58) Field of Classification Search
CPC ................. G06F 9/45558; G06F 9/544; G06F 2009/45579; G06F 2009/45583;
(Continued)

(56) References Cited

U.S. PATENT DOCUMENTS 7,356,818 B2 4/2008 Carollo et al.
7,657,659 B1 2/2010 Lambeth
(Continued)

FOREIGN PATENT DOCUMENTS

CN 102467408 A 5/2012
CN 103346981 A 10/2013
(Continued)

OTHER PUBLICATIONS

English translation of International Search Report mailed Aug. 5, 2019, from corresponding PCT Application No. PCT/CN2019/087799, 2 pages.
(Continued)

*Primary Examiner* — Kenneth Tang
(74) *Attorney, Agent, or Firm* — Lee & Hayes, P.C.

(57) ABSTRACT

A method including acquiring virtual location information of a virtual data buffer of a virtual network interface component; designating physical location information of a physical data buffer of a physical network interface component as the virtual location information; and storing data according to the virtual location information when the data is being stored into the physical data buffer. Since the physical location information of the physical data buffer of the physical network interface component is designated as the virtual location information instead of being determined via allocation by a physical device. Thus, the physical network interface component is capable of storing, upon receiving data, the data into a data buffer designated by the virtual network interface component, thereby eliminating the process of copying data from a data buffer designated by the physical network interface component to the data buffer designated by the virtual network interface component.

20 Claims, 10 Drawing Sheets

(52) U.S. Cl.
CPC .............. *G06F 2009/45583* (2013.01); *G06F 2009/45595* (2013.01)

(58) Field of Classification Search
CPC ......... G06F 2009/45595; G06F 9/5016; G06F 9/5077; G06F 13/12; G06F 13/128; G06F 13/1673
See application file for complete search history.

(56) References Cited

U.S. PATENT DOCUMENTS

| | | | |
|---|---|---|---|
| 7,733,890 | B1 | 6/2010 | Droux et al. |
| 7,984,123 | B2 | 7/2011 | Tripathi et al. |
| 8,174,984 | B2 | 5/2012 | Tripathi et al. |
| 8,683,000 | B1 | 3/2014 | Schlansker et al. |
| 8,739,179 | B2 | 5/2014 | Tripathi |
| 9,608,940 | B2 | 3/2017 | Chan et al. |
| 10,178,054 | B2 | 1/2019 | Palermo et al. |
| 2005/0204058 | A1* | 9/2005 | Philbrick ................ H04L 61/00 709/236 |
| 2006/0288129 | A1* | 12/2006 | Pope ..................... G06F 13/385 710/22 |
| 2007/0061492 | A1 | 3/2007 | Van Riel |
| 2007/0162572 | A1* | 7/2007 | Aloni .................. G06F 9/45558 709/219 |
| 2009/0183180 | A1* | 7/2009 | Nelson ................ G06F 9/45558 718/1 |
| 2010/0223419 | A1* | 9/2010 | Cardona ................. G06F 9/544 718/1 |
| 2012/0311597 | A1* | 12/2012 | Manula ................. G06F 9/5077 718/104 |
| 2012/0331250 | A1* | 12/2012 | Nelson ................... G06F 9/546 711/E12.103 |
| 2014/0143366 | A1* | 5/2014 | Thakkar ............. G06F 9/45558 709/212 |
| 2014/0219287 | A1 | 8/2014 | Birke et al. |
| 2014/0280674 | A1* | 9/2014 | Arramreddy ........... H04L 49/90 709/213 |
| 2014/0344488 | A1* | 11/2014 | Flynn ........................ G06F 5/14 710/52 |
| 2015/0200866 | A1* | 7/2015 | Pope ..................... G06F 13/128 370/413 |
| 2015/0370586 | A1* | 12/2015 | Cooper ............... G06F 12/0223 718/1 |
| 2016/0266925 | A1 | 9/2016 | Wei |
| 2016/0283421 | A1* | 9/2016 | Wilson ..................... G06F 13/28 |
| 2016/0306645 | A1* | 10/2016 | Serebrin ............. G06F 9/45558 |
| 2017/0024341 | A1* | 1/2017 | Davda ....................... G06F 13/28 |
| 2017/0123835 | A1* | 5/2017 | Mizuno ................. G06F 9/5077 |
| 2017/0161090 | A1* | 6/2017 | Kodama .................. H04L 49/70 |
| 2017/0289068 | A1 | 10/2017 | Palermo et al. |

FOREIGN PATENT DOCUMENTS

| | | |
|---|---|---|
| CN | 103677674 A | 3/2014 |
| CN | 106612306 A | 5/2017 |
| CN | 107608806 A | 1/2018 |
| CN | 107995129 A | 5/2018 |
| CN | 108243118 A | 7/2018 |
| JP | 2013196138 A | 9/2013 |
| JP | 2014531093 A | 11/2014 |

OTHER PUBLICATIONS

English translation of Written Opinion mailed Aug. 5, 2019, from corresponding PCT Application No. PCT/CN2019/087799, 7 pages.
Dong, et al, "High performance network virtualization with SR-IOV", High Performance Computer Architecture, 2010 IEEE 16th International Symposium, Jan. 9, 2010, pp. 1-10.
Extended European Search Report mailed Jan. 31, 2022 for European Patent Application No. 19811105.6, 9 pages.
Kalman, et al, "Zero-copy Receive for vhost", retrieved from <<https://events17.linuxfoundation.org/sites/events/files/slides/Zero-copy%20receive%20for%20vhost.pdf>>, Nov. 20, 2017, pp. 1-18.
Rapoport, "Zero-Copy Receive for vhost", retrieved from <<https://www.youtube.com/watch?v=szA5h7od634>>, Nov. 20, 2017, 2 pages.
Tianhua, et al, "The Design and Implementation of Zero-Copy for Linux", Intelligent Systems Design and Applications, 2008 IEEE Eighth International Conference, Nov. 26, 2008, pp. 121-126.
Translation of Chinese First Office Action for corresponding Chinese application No. CN201810539153 dated Sep. 26, 2022, 10 pages.
Translation of Chinese Search Report for Corresponding Chinese Application CN201810539153 dated Sep. 19, 2022, 1 page.
The European Office Action mailed May 19, 2023 for European patent application No. 19811105.6, a foreign counterpart of U.S. Appl. No. 17/100,548, 6 pages.
Japanese Office Action mailed Jul. 18, 2023 for Japanese Patent Application No. 2020-566722, a foreign counterpart to U.S. Appl. No. 17/100,548, 9 pages.
Mike Rapoport, Zero copy receive for vhost, https://www.youtube.com/watch?v=szA5h7od634, dated Nov. 20, 2017.
Translation of Chinese 1st Search Report for corresponding Chinese application No. 201810539153 dated Sep. 26, 2022, 1 page.
Translation of Chinese 2nd Office Action for corresponding Chinese application No. 201810539153 dated Feb. 24, 2023, 10 pages.
Translation of Chinese Office Action for corresponding Chinese application No. 201810539153 dated May 26, 2023, 6 pages.
Office Action for European Application No. 19811105.6, Dated Jul. 16, 2024, 5 pages.

* cited by examiner

DATA BUFFERING METHOD, DATA PROCESSING METHOD, COMPUTER DEVICE, STORAGE MEDIUM

CROSS REFERENCE TO RELATED APPLICATIONS

This application claims priority to and is a continuation of PCT Patent Application No. PCT/CN2019/087799, filed on 21 May 2019 and entitled "DATA CACHING METHOD, DATA PROCESSING METHOD, COMPUTER DEVICE, STORAGE MEDIUM," which claims priority to Chinese Patent Application No. 201810539153.1, filed on 30 May 2018 and entitled "DATA BUFFERING METHOD, DATA PROCESSING METHOD, COMPUTER DEVICE, STORAGE MEDIUM," which are incorporated herein by reference in their entirety.

TECHNICAL FIELD

The present disclosure relates to the technical field of data processing, and more particularly, to data buffering methods, data processing methods, computer devices, and computer-readable storage media.

BACKGROUND

In a virtual network, a virtual machine (VM) simulated on a physical machine (a physical machine may also be referred to as a physical computer, a computer device, or a host device) provides, via a vSwitch (virtual switch), network services, such as virtual switch routing, and tunnel end-point (TEP). The vSwitch is implemented purely using software, which also provides good network throughput performance. The main problem thereof, however, is that the vSwitch needs to occupy some of the CPU and memory resources on the physical machine, which hinders resource utilization of the physical machine.

In light of the above, a solution of using a smart network card has been created. The main purpose is to embed the vSwitch function to a smart network card, such that more physical machine resources are released to clients, aiming to provide a better network throughput.

With regard to a packet receiving process, a network card of a physical machine must first store, upon receiving a packet sent to a virtual machine, the packet into a data buffer designated by the network card driver, and then copy the data to a data buffer designated by a virtual network card of the virtual machine. This leads to the problem that the data needs to be copied during the data receiving process. Such copy processing leads to an increased time cost and reduced network performance when data is received, and higher network latency.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of the above-described problems, the present disclosure is proposed in order to provide a data buffering method, a data processing method, a computer device, and a computer-readable storage medium which overcome or at least partially solve the above-described problems.

According to one aspect of the present disclosure, a data buffering method is provided, comprising:

acquiring virtual location information of virtual data buffers of a virtual network interface component;

designating physical location information of a physical data buffer of a physical network interface component as the virtual location information; and storing data according to the virtual location information when the data is being stored into the physical data buffer.

For example, before said acquiring the virtual location information of the virtual data buffers of the virtual network interface component, the method further comprises:

allocating a virtual storage space for the virtual network interface component; and determining virtual location information of multiple virtual data buffers in the virtual storage space.

For example, said determining the virtual location information of the multiple virtual data buffers in the virtual storage space comprises:

creating a virtual receiving queue of the virtual network interface component, the virtual receiving queue comprising virtual buffer control information;

acquiring, from the virtual storage space, the virtual location information; and adding the virtual location information to the virtual buffer control information.

For example, said acquiring the virtual location information of the data buffers of the virtual network interface component comprises:

performing detection on the virtual location information in the virtual receiving queue.

For example, before said performing the detection on the virtual location information in the virtual receiving queue, the method further comprises:

receiving a notification that initialization of the virtual network interface component is completed.

For example, said designating the physical location information of the physical data buffer of the physical network interface component as the virtual location information comprises:

converting the virtual location information into physical addresses; and determining, according to the physical addresses, the physical location information of the physical data buffer.

For example, said determining, according to the physical addresses, the physical location information of the physical data buffer comprises:

adding the physical addresses to physical buffer control information of the physical data buffer.

For example, before said designating the physical location information of the physical data buffer of the physical network interface component as the virtual location information, the method further comprises:

creating an information queue composed of the physical buffer control information, and creating an empty physical storage space;

said adding the physical addresses to the physical buffer control information of the physical data buffer comprises:

acquiring the physical buffer control information in the information queue;

adding, in sequence, the physical addresses to the acquired physical buffer control information; and storing the physical buffer control information into the physical storage space.

For example, before said storing the data according to the virtual location information when the data is being stored into the physical data buffer, the method further comprises:

acquiring the physical buffer control information in the physical storage space;

creating physical receiving queues of the physical network interface component; and adding the physical buffer control information to the physical receiving queues.

For example, the virtual network interface component has a one-to-one mapping to the physical receiving queue of the physical network interface component, the physical receiving queue has a one-to-one mapping to the physical data buffer; and said storing the data according to the virtual location information when the data is being stored into the physical data buffer comprises:

determining, according to the data, a virtual network interface component to which the data is to be sent;

acquiring, from a physical receiving queue corresponding to said virtual network interface component, physical location information of a corresponding physical data buffer; and storing the data according to the physical location information.

For example, said acquiring, from the physical receiving queue corresponding to said virtual network interface component, the physical location information of the corresponding physical data buffer comprises:

acquiring the physical buffer control information in the physical receiving queue, the physical buffer control information comprising the physical location information; and after said storing the data according to the physical location information, the method further comprises: marking, in the physical control buffer information, that data is received, such that a physical machine detects the received data.

For example, the method further comprises:

marking, according to the physical buffer control information, in the virtual buffer control information of the virtual receiving queue in the virtual network interface component that data is received, such that the virtual network interface component detects the received data.

For example, the method further comprises:

notifying, according to the physical buffer control information, the virtual network interface component that data is received.

Accordingly, according to another aspect of the present disclosure, a data processing method is further provided, comprising:

receiving a data storage instruction, wherein the data storage instruction is used to store data into a physical location of a physical data buffer of a physical network interface component;

acquiring a virtual location of a virtual data buffer of a virtual network interface component corresponding to the physical location of the physical data buffer of the physical network interface component; and storing the data into the virtual location.

Accordingly, according to another aspect of the present disclosure, a computer device is further provided, and comprises a memory, a processor, and a computer program stored on the memory and executable on the processor, wherein the processor implements one or more of the methods described above when executing the computer program.

Accordingly, according to another aspect of the present disclosure, a computer-readable storage medium is further provided, and has a computer program stored thereon, wherein the program implements one or more of the methods described above when being executed by a processor.

According to the embodiments of the present disclosure, by acquiring virtual location information of a virtual data buffer of a virtual network interface component, designating physical location information of a physical data buffer of a physical network interface component as the virtual location information, and storing the data according to the virtual location information when the data is being stored into the physical data buffer, the present disclosure enables the physical network interface component to directly store, upon receiving data, the received data into a data buffer designated by the virtual network interface component since the physical location information of the physical data buffer of the physical network interface component is designated as the virtual location information instead of being determined via allocation by a physical device, thereby eliminating the process of copying data from a data buffer designated by the physical network interface component to the data buffer designated by the virtual network interface component, which in turn reduces time consumed on receiving data, improves network performance in data receiving, and reduces network latency.

The above description is only an overview of the technical solutions of the present disclosure. In order for those skilled in the art to better understand the technical means of the present disclosure, and further to implement in accordance with the content of the specification, and in order to make the above and other purposes, features, and advantages of the present disclosure more obvious and understandable, the specific implementation manners of the present disclosure are illustrated below.

BRIEF DESCRIPTION OF DRAWINGS

To describe the technical solutions in the example embodiments of the present disclosure more clearly, the following briefly describes the accompanying drawings. Apparently, the accompanying drawings in the following description merely represent some embodiments of the present disclosure, and those of ordinary skill in the art may further derive other accompanying drawings from these accompanying drawings without inventive efforts.

DETAILED DESCRIPTION

Hereinafter, example embodiments of the present disclosure will be described in more detail with reference to the accompanying drawings. Although the drawings show example embodiments of the present disclosure, it should be understood that the present disclosure may be implemented in various forms and should not be limited by the embodiments set forth herein. Rather, these embodiments are provided to enable a more thorough understanding of the present disclosure and to fully convey the scope of the present disclosure to those skilled in the art.

To enable those skilled in the art to better understand the present disclosure, the concepts involved in the present disclosure are explained below.

Figure 1:
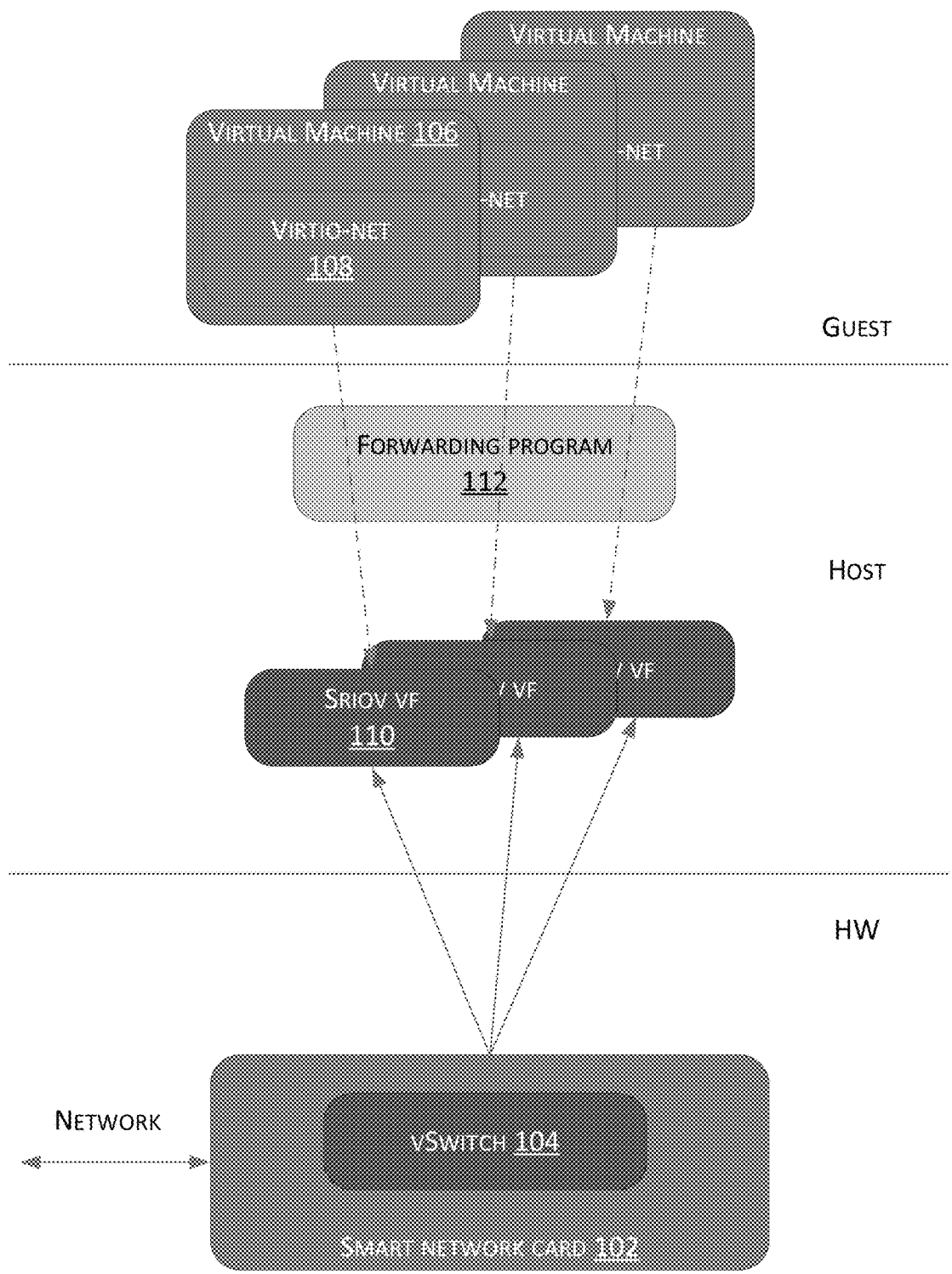
FIG. 1 illustrates a schematic diagram of virtual machine deployment.

A virtual network interface component includes an interface connecting a virtual machine and a transmission medium in a virtual network, and is capable of receiving data from a network to be used by the virtual machine. For example, it may be any applicable virtual network interface component, which is not limited by the embodiments of the present disclosure. For example, in the schematic diagram of virtual machine deployment as shown in FIG. 1, a smart network card 102 having the function of vSwitch 104 is adopted on a physical machine. Each virtual machine 106 on the physical machine adopts the virtio-net 108 as a virtual network card interface (i.e., a virtual network interface component).

The virtual network interface component predesignates a virtual data buffer for storing and processing data, for example, a memory area at a location designated by a virtio-net interface driver. For example, it may include any applicable virtual data buffer, which is not limited by the embodiments of the present disclosure.

Accordingly, virtual location information is used to designate a location of the virtual data buffer, for example, memory addresses of multiple virtual data buffers in a memory pool designated by the virtio-net interface driver. For example, it may include any applicable virtual location information, which is not limited by the embodiments of the present disclosure.

A physical network interface component includes an interface connecting a physical machine and a transmission medium in a network, and is capable of receiving data from the network to be used by the physical machine. For example, it may include any applicable physical network interface component, which is not limited by the embodiments of the present disclosure. For example, as shown in FIG. 1, the smart network card 102 having the function of vSwitch 104 adopted by the physical machine is a physical network interface component. It is worth noting that since the industry generally adopts the standard virtio-net virtual network card interface, and current smart network cards do not support the virtio-net virtual network card interface, a traffic on a network therefore cannot be directly sent to the virtual machine 108, but sent only to a VF device (a function associated with a physical function) of SRIOV VF 110 (a hardware-based virtualization solution). Each SRIOV VF 110 device on the physical machine has a one-to-one mapping relationship with a virtio-net 108 interface of the virtual machine. One simple forwarding program 112 on the physical machine completes conversion from VF devices to virtio-net interfaces, thereby connecting a virtual machine network with a physical network card.

The physical network interface component predesignates a physical data buffer, for example, a memory area at a location designated by a smart network card driver, for storing and processing data. For example, it may include any applicable physical data buffer, which is not limited by the embodiments of the application.

Accordingly, physical location information is used to designate a location of a physical data buffer, for example, memory addresses of multiple physical data buffers in a memory pool that a smart network card driver designates. For example, it may include any applicable physical location information, which is not limited by the embodiments of the application.

In an example embodiment of the present disclosure, a kernel of the virtual machine or an APP (application) running on the virtual machine may allocate a virtual storage space for a virtual network interface component as a data storage region. The virtual storage space may include multiple virtual data buffers. For example, the kernel or APP of the virtual machine initializes one mem pool (memory pool), i.e., a virtual storage space, which is provided to a virtio-net interface driver as a storage area for packets.

In an example embodiment of the present disclosure, a virtual receiving queue needs to be created for a virtual network interface component, and the queue is used for communication between a software driver and hardware, and mainly stores control information for receiving packet data from a network. Each element of the virtual receiving queue is referred to as virtual buffer control information. The virtual buffer control information is used to describe the characteristics and states of a virtual data buffer, such as the packet length, data buffer length, etc. Virtual buffer control information defined by different network devices may have different formats and sizes, but at least includes the address of a virtual data buffer, which is not limited by the embodiments of the present disclosure.

For example, the virtio-net interface driver initializes a device, and ultimately initializes a rxq (receiving queue), which is essentially one queue used for communication between a software driver and hardware. Each element of the queue is called a descriptor (i.e., the virtual buffer control information). The descriptor is a data format defined by a network card for sending and receiving packet queues and performing software communication. Each descriptor defined by various types of network devices at least includes the address of a data buffer.

In an example embodiment of the present disclosure, the virtual location information, which is defined by the virtual machine and is not a physical address on a hardware storage device of a physical machine (i.e., a physical address), includes the memory address, the hard disk address, or the like on the physical machine, or any other applicable physical address, which is not limited by the embodiments of the present disclosure. The virtual location information of the virtual machine may be converted into a physical address.

In an example embodiment of the present disclosure, physical buffer control information is used to describe the characteristics and states of a physical data buffer, such as the packet length, the data buffer length, and the like. Physical buffer control information defined by different network devices may have different formats and sizes, but may at least include the address of a physical data buffer or any other applicable information, which is not limited by the embodiments of the application.

For example, each element of a memory pool is not only one data buffer. Rather, each data buffer must contain one control structure, i.e., a data set having the same type or different types of data, which is referred to as the physical buffer control information in the present disclosure. Assuming that a mem pool (memory pool) of a physical machine defines the control structure referred to as bctl:

```
typedef struct buf ctrl {
  void *addr
  ......
} bctl.
```

In an example embodiment of the present disclosure, an information queue is used to store the physical buffer control information. In other words, each element of the queue is the physical buffer control information. A physical storage space allocated on a physical machine is used as a storage area for data.

In an example embodiment of the present disclosure, a physical receiving queue needs to be created for a physical network interface component, and the queue is used for communication between a software driver and hardware, and mainly stores control information for receiving packet data from a network. Each element of the physical receiving queue is referred to as physical buffer control information.

In an example embodiment of the present disclosure, since a physical machine adopts a smart network card having a vSwitch function, the smart network card is capable of distributing, upon receiving data, data directed to different virtual machines to corresponding VF devices. The VF devices act as output ports of the smart network card, and therefore need to have corresponding physical receiving queues on the physical machine. Since the VF devices have a one-to-one mapping to virtual network interface components, and the VF devices have a one-to-one mapping to the physical receiving queues, the virtual network interface components also have a one-to-one mapping to the physical receiving queues of the physical network interface component. In addition, the physical receiving queues also have a one-to-one mapping to physical data buffers, such that data sent to different virtual machines may be buffered in different physical data buffers via different physical receiving queues.

Figure 2:
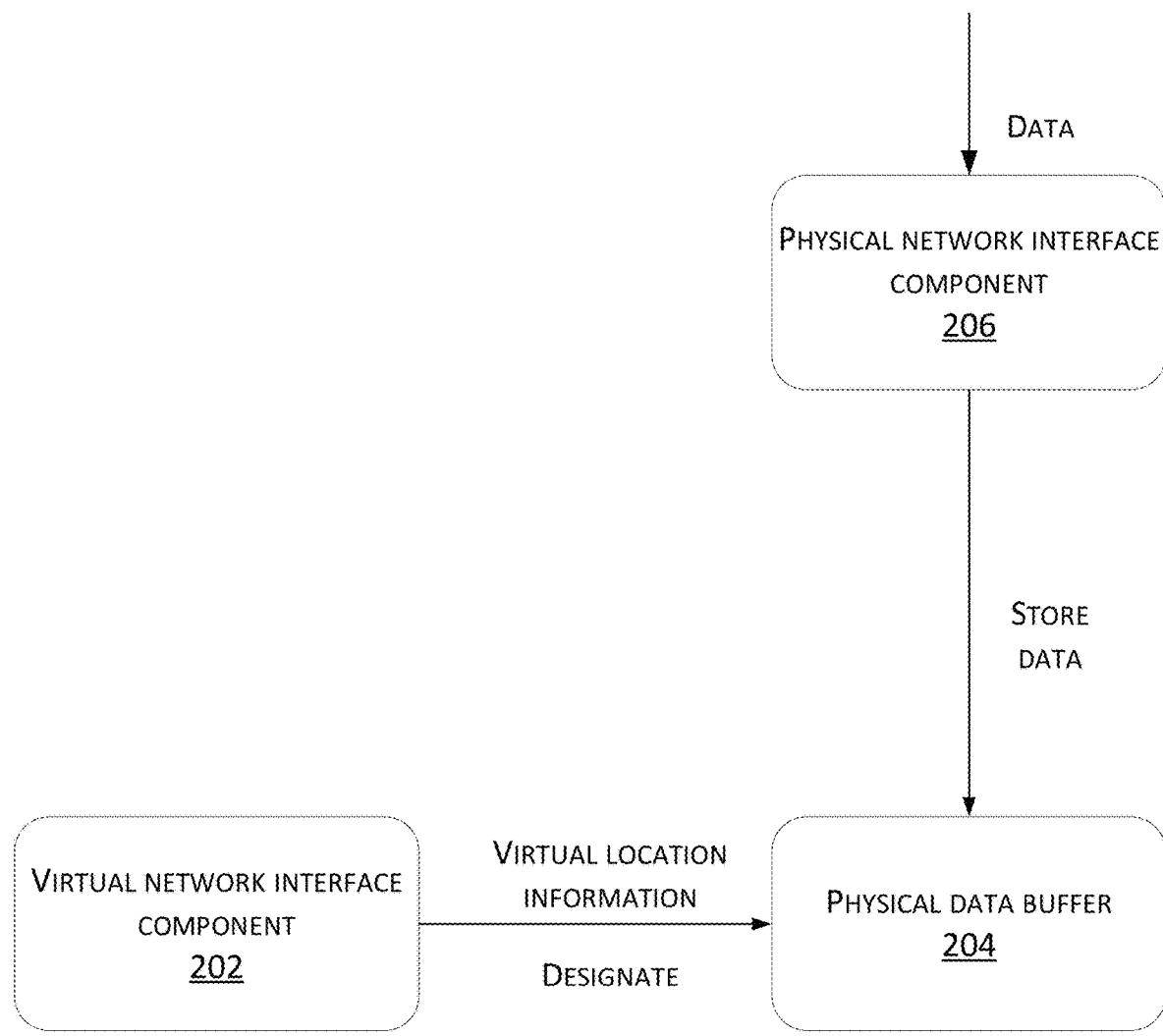
FIG. 2 illustrates a schematic diagram of a data buffering process.

According to an embodiment of the present disclosure, in a packet receiving process, a network card of a physical machine must first store, upon receiving a packet sent to a virtual machine, the packet into a data buffer designated by the network card driver, and then copy the data to a data buffer designated by a virtual network card of the virtual machine, leading to the problem that the data needs to be copied during the data receiving process. As shown in FIG. 2, a schematic diagram of a data buffering process, the present disclosure provides a data buffering mechanism, which acquires virtual location information of a virtual data buffer of a virtual network interface component 202, designates physical location information of a physical data buffer 204 of a physical network interface component 206 as the virtual location information, and stores data according to the virtual location information when the data is being stored into the physical data buffer 204. Since the physical location information of the physical data buffer 204 of the physical network interface component 206 is designated as the virtual location information instead of being determined via allocation by a physical device, the physical network interface component 206 is capable of directly storing, upon receiving data, the received data into the physical data buffer 204 designated by the virtual network interface component 202, thereby eliminating the process of copying data from a data buffer designated by the physical network interface component to the data buffer designated by the virtual network interface component, which in turn reduces time consumed on receiving data, improves network performance in data receiving, and reduces network latency. The present disclosure is applicable but not limited to the above application scenarios.

Figure 3:
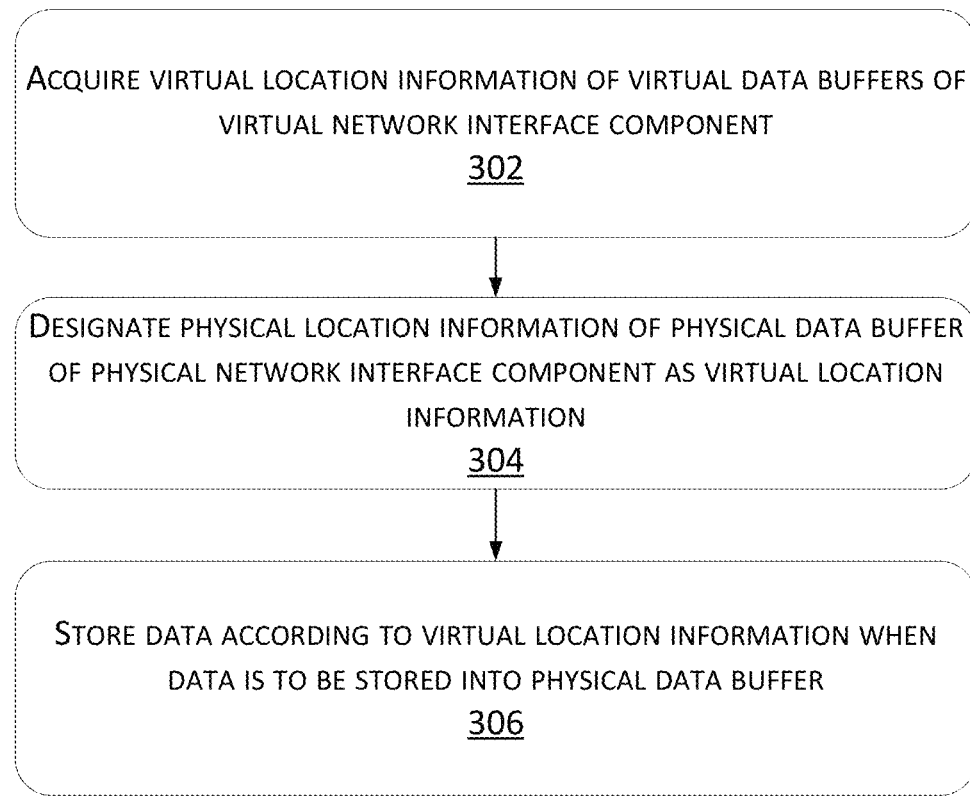
FIG. 3 illustrates a flowchart of an embodiment of a data buffering method according to an embodiment of the present disclosure.

Referring to FIG. 3, a flowchart of an embodiment of a data processing method according to an embodiment of the present disclosure is shown. The method may comprise the following steps.

Step 302: acquiring virtual location information of virtual data buffers of a virtual network interface component. In an embodiment of the present disclosure, after the virtual network interface component has been initialized, the virtual location information of the virtual data buffers may then be obtained. For example, pointer information of all data buffers (i.e., virtual data buffers) is obtained by scanning rxq queues of virtio-net interfaces. For example, this may include acquiring virtual location information in any applicable manner, which is not limited by the embodiments of the present disclosure.

Step 304: designating physical location information of a physical data buffer of a physical network interface component as the virtual location information.

In an embodiment of the present disclosure, in an initialization process of the physical network interface component, the physical location information would originally be designated by a physical machine, which results in a location difference between the physical data buffer and the virtual data buffer. In order to eliminate copying of received data from the physical data buffer to the virtual data buffer, the physical location information of the physical data buffer is directly designated as the acquired virtual location information. Various ways may be adopted to designate the physical location information as the virtual location information, which is not limited by the embodiments of the present disclosure.

For example, a forwarding program on the physical machine may create one queue, and each element in the queue is the bctl control structure defined above. The physical machine creates one empty memory pool having no data buffers or control structures therein. The forwarding program of the physical machine receives a notification that virtio-net interfaces have been initialized, and scans rxq virtual receiving queues of the virtio-net interfaces to obtain pointer information of all data buffers. The virtual location information of the data buffers is converted into physical addresses of the physical machine; then bctl control structures having no data buffers are obtained from the queue; and physical location information in the bctl control structures is assigned values to become the physical addresses converted from the virtual location information using the assignment operation. Ultimately, the bctl control structures are enqueued into the memory pool. At this point, data buffers in the memory pool of the physical machine are essentially the addresses allocated by the virtual machine. Subsequently, when the forwarding program initializes a rxq physical receiving queue of the physical network interface component, the physical location information is obtained by dequeuing from the memory pool, which is actually the virtual location information allocated by the virtual machine.

Step 306: storing data according to the virtual location information when the data is being stored into the physical data buffer.

Upon receiving data from a network, the physical network interface component buffers the data in a memory on the physical network interface component. The vSwitch function then decides, according to the data, to which virtual machine the data is to be sent. Before the data is sent to the virtual machine, it needs to be stored into a physical data buffer on the physical machine first, and then sent to the virtual machine by the forwarding program.

In an embodiment of the present disclosure, when the data is being stored in a physical data buffer, a physical receiving queue corresponding to the virtual machine is read to obtain information of the physical data buffer; and the physical data buffer has been filled in the previous initialization process. Next, hardware sends the data to a designated memory of the physical machine by means of DMA (Direct Memory Access). In other words, when the data is being stored in the physical data buffer, the data is actually being stored according to the virtual location information since the physical location information is designated as the virtual location information. After that, simply configure corresponding control information to indicate that data from the network is delivered to the physical data buffer of the physical network interface component. The forwarding program discovers, according to the control information, that there is delivered data, and correspondingly updates the control information of the virtual network interface component according to the virtual machine to which the data is to be delivered, or actively notifies the virtual network interface component. Finally, the virtual network interface component discovers that there is delivered data, and then notifies the virtual machine to fetch the data from the virtual data buffer according to the virtual location information.

In an embodiment of the present disclosure, the data is stored into the physical data buffer according to the virtual location information, which means that the physical data buffer and the virtual data buffer are at the same location. For the physical machine, the data is stored in the physical data buffer; and for the virtual machine, the data has been stored in the virtual data buffer. Therefore, copying the data from the physical data buffer to the virtual data buffer is not required. The data can be fetched from the virtual data buffer as long as the virtual machine is notified that data is delivered.

According to the embodiments of the present disclosure, by acquiring virtual location information of a virtual data buffer of a virtual network interface component, designating physical location information of a physical data buffer of a physical network interface component as the virtual location information, and storing the data according to the virtual location information when the data is being stored into the physical data buffer, the present disclosure enables the physical network interface component to directly store, upon receiving data, the received data into a data buffer designated by the virtual network interface component since the physical location information of the physical data buffer of the physical network interface component is designated as the virtual location information instead of being determined via allocation by a physical device, thereby eliminating the process of copying data from a data buffer designated by the physical network interface component to the data buffer designated by the virtual network interface component, which in turn reduces time consumed on receiving data, improves network performance in data receiving, and reduces network latency.

Figure 4:
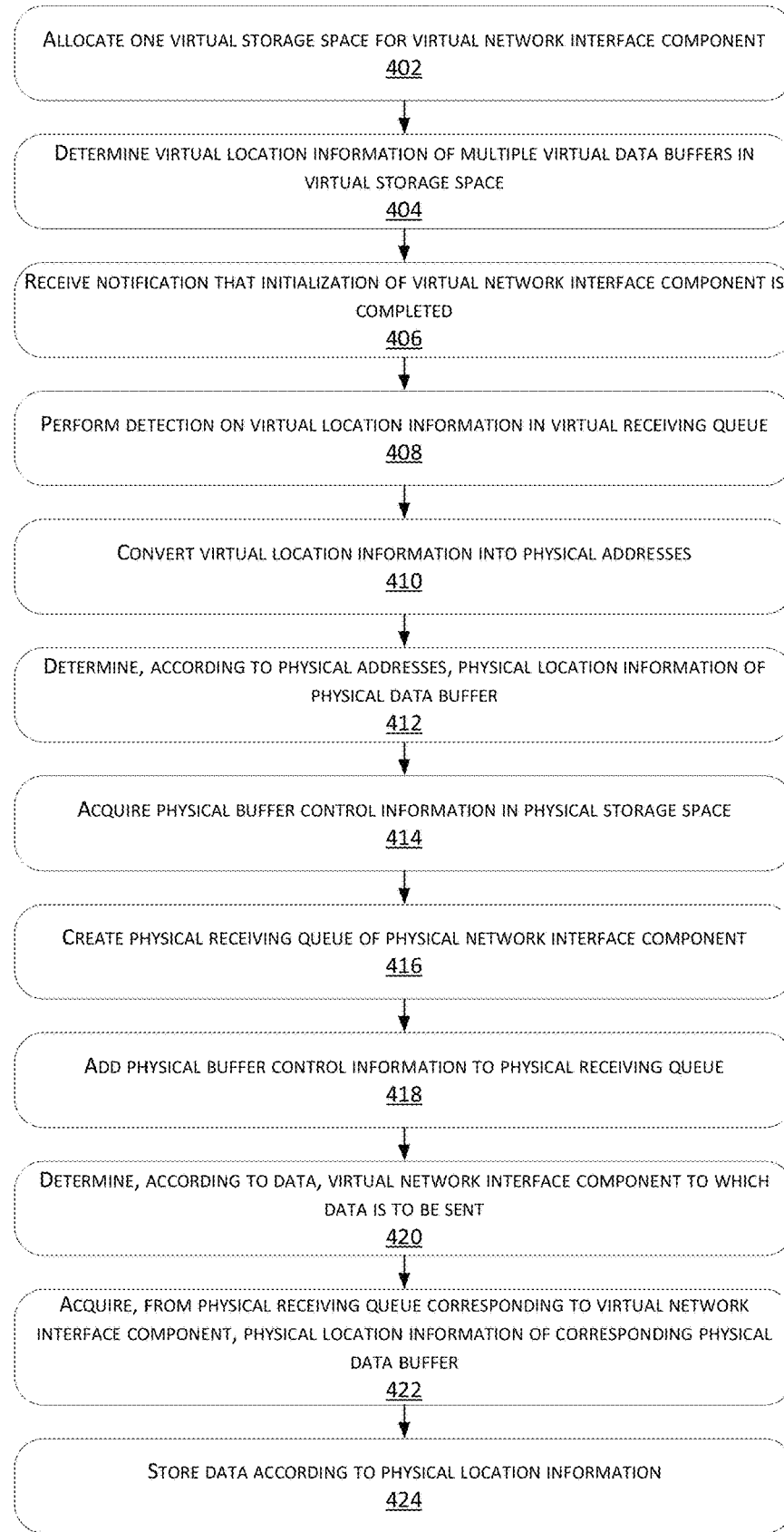
FIG. 4 illustrates a flowchart of an embodiment of a data buffering method according to an embodiment of the present disclosure.

Referring to FIG. 4, a flowchart of an embodiment of a data processing method according to an embodiment of the present disclosure is shown. The method may comprise the following steps.

Step 402: allocating a virtual storage space for the virtual network interface component.

In an embodiment of the present disclosure, in order to eliminate the process of copying data from a physical data buffer to a virtual data buffer, an initialization process needs to be optimized first. The initialization process of a virtual machine includes the step of preparing the virtual storage space. This step involves first allocating one virtual storage space for the virtual network interface component, and providing the space to a driver of the virtual network interface component as a data storage area. A mem pool contains virtual data buffers, which are configured to be filled with packet data.

For example, the kernel or APP of the virtual machine is responsible for initializing one mem pool (i.e., the virtual storage space), which is provided to the driver of a virtio-net interface as a storage area for packets.

Step 404: determining virtual location information of multiple virtual data buffers in the virtual storage space.

In an embodiment of the present disclosure, the virtual storage space contains multiple virtual data buffers, and the virtual network interface component needs to first determine the virtual location information of the multiple virtual data buffers, which may be continuously dequeuing from the virtual storage space allocated for the virtual network interface component and obtaining the virtual location information of new virtual data buffers. For example, it may include any applicable manner, which is not limited by the embodiments of the present disclosure.

In an embodiment of the present disclosure, for example, an implementation manner of determining the virtual location information of the multiple virtual data buffers in the virtual storage space may include:

sub-step S1: creating a virtual receiving queue of the virtual network interface component, the virtual receiving queue comprising virtual buffer control information;

sub-step S2: acquiring, from the virtual storage space, the virtual location information; and sub-step S3: adding the virtual location information to the virtual buffer control information.

For example, the driver of the virtio-net interface performs device initialization, and ultimately initializes a rxq virtual receiving queue. Each element of the rxq is called a descriptor, i.e., the virtual buffer control information. The process of initializing the rxq queue includes filling each descriptor with one data buffer pointer, which points to one valid virtual data buffer, referred to as GPA here (Guest Physical Address, a physical address of the virtual machine). The driver obtains the virtual location information of new virtual data buffers by continuously dequeuing from the mem pool, and then fills it into descriptors (i.e., the virtual buffer control information).

Step 406: receiving a notification that initialization of the virtual network interface component is completed.

In an embodiment of the present disclosure, after the virtual network interface component has been initialized, the virtual receiving queue of the virtual network interface component may be enabled to become ready for receiving data packets on a network. A forwarding program of a physical machine receives the notification that the virtual network interface component has been initialized, and then executes step 204.

Step 408: performing detection on the virtual location information in the virtual receiving queue.

In an embodiment of the present disclosure, after the notification that the virtual network interface component has been initialized is received, scanning and detection of the virtual receiving queue of the virtual network interface component is performed so that the virtual location information of all virtual data buffers may be acquired. For example, a rxq queue of a virtio-net interface is scanned to obtain information of all data buffer pointers, i.e., the virtual location information.

Step 410: converting the virtual location information into physical addresses.

In an embodiment of the present disclosure, a virtual data buffer used by the virtual machine is essentially on the physical machine. However, the virtual location information of the virtual machine is for the virtual data buffer used by the virtual machine. Since the virtual location information has been virtualized, it is different from the actual physical address on the physical machine. A correspondence relationship therebetween, however, is present. In order to determine the actual physical address on the physical machine, it is necessary to perform conversion according to the virtual location information and the correspondence relationship between virtual location information and physical addresses. For example, a GPA of a data buffer is converted into an HPA (Host Physical Address, a physical address of the physical machine).

Step 412: determining, according to the physical addresses, the physical location information of the physical data buffer.

In an embodiment of the present disclosure, after the virtual location information is converted into the physical address, the physical location information of the physical data buffer may be determined according to the physical address. For example, assignment may be performed such that the physical location information is equal to the physical addresses.

In an embodiment of the present disclosure, for example, an implementation manner of determining the physical location information of the physical data buffer according to the physical addresses may include: adding the physical addresses to physical buffer control information of the physical data buffer.

The physical buffer control information of the physical data buffer includes the physical location information. An assignment operation is performed such that the physical location information is equal to the physical addresses, which means that the physical addresses are added to the physical buffer control information. For example, the physical addresses may be added to the physical buffer control information of the physical data buffer in any applicable manner, which is not limited by the embodiments of the present disclosure.

In an embodiment of the present disclosure, for example, before said designating the physical location information of the physical data buffer of a physical network interface component as the virtual location information, the following may be further included: creating an information queue composed of the physical buffer control information component, and creating an empty physical storage space. Accordingly, an implementation manner of adding the physical addresses to the physical buffer control information of the physical data buffer may include: acquiring the physical buffer control information in the information queue; adding, in sequence, the physical addresses to the acquired physical buffer control information; and storing the physical buffer control information into the physical storage space.

For example, after the virtio-net interface is initialized, the forwarding program on the physical machine creates one queue, i.e., the information queue. Each element of the queue is the defined control structure bctl of a data buffer (a physical data buffer), which may also be referred to as a descriptor, i.e., the physical buffer control information. One empty mem pool is further created and does not contain any data buffers or control structures. After the virtual location information is converted into the physical addresses, a control structure bctl having no data buffers is obtained from the information queue; and bctl.addr is set to be equal to GPA, and ultimately enqueued into the mem pool (i.e., the physical storage space). At this point, the data buffer of the mem pool is essentially the virtual location information allocated by the virtual machine.

Step 414: acquiring the physical buffer control information in the physical storage space.

In an embodiment of the present disclosure, when a physical receiving queue of a physical network interface component is initialized, the physical buffer control information comprising the physical location information is acquired from the physical storage space. The physical location information is essentially the designated virtual location information.

For example, when the forwarding program is initializing a rxq physical receiving queue of a smart network card (i.e., the physical network interface component), dequeuing from a mem pool (i.e., the physical storage space) is performed. Data buffer pointers filled with descriptors (i.e., the physical buffer control information) are actually the virtual location information of the virtual machine.

Step 416: creating a physical receiving queue of the physical network interface component.

In an embodiment of the present disclosure, the process of initializing the physical network interface component includes initialization of the physical receiving queue, which means that the physical receiving queue is created. The physical receiving queue may include multiple physical receiving queues, such that respective physical receiving queues are correspondingly created for different virtual network interface components.

Step 418: adding the physical buffer control information to the physical receiving queue.

In an embodiment of the application, the acquired physical buffer control information is added to the physical receiving queue. For example, in a rxq physical receiving queue of the smart network card, the physical buffer control information is added to the rxq in a descriptor format. That is, the pointer of the data buffer (i.e., the physical data buffer) filled with the descriptors is actually a pointer of a data buffer (i.e., the virtual data buffer) of the virtual machine.

Step 420: determining, according to the data, a virtual network interface component to which the data is to be sent.

In an embodiment of the present disclosure, after both the virtual network interface component and the physical network interface component have been initialized and enabled, they may start receiving packet data on a network.

In an embodiment of the present disclosure, the virtual network interface component has a one-to-one mapping to the physical receiving queue of the physical network interface component, and the physical receiving queue has a one-to-one mapping to the physical data buffer. Since the physical network interface component has the vSwitch function, it means that the physical network interface component needs to decide to which virtual machine the packet data is to be sent, rather than having the packet data sent to the physical machine first and letting the physical machine conclude to which virtual machine the packet data is to be sent. Therefore, the virtual network interface component to which the data is to be sent, i.e., the virtual machine to which the data is to be sent, needs to be determined according to the data.

For example, a smart network card receives one piece of packet data from a network and buffers it in the memory of the network card. Then, according to a packet header, the vSwitch function decides to which virtual machine (that is, a certain virtual network interface component) the packet data should be sent.

Step 422: acquiring, from a physical receiving queue corresponding to the virtual network interface component, physical location information of a corresponding physical data buffer.

In an embodiment of the present disclosure, since a virtual network interface component has a one-to-one mapping to a physical receiving queue of the physical network interface component, different virtual network interface components correspond to different physical receiving queues. In order to enable sending the data to the virtual network interface component to which the data is to be sent, the physical location information of the corresponding physical data buffer needs to be acquired from the physical receiving queue corresponding to said virtual network interface component. For example, it may include any applicable manner of obtaining the physical location information, which is not limited by the embodiments of the present disclosure.

Step 424: storing the data according to the physical location information.

In an embodiment of the present disclosure, the acquired physical location information is essentially the virtual location information. Therefore, storing the data according to the physical location information is equivalent to storing the data according to the virtual location information.

In an embodiment of the present disclosure, for example, an implementation manner of acquiring the physical location information of the corresponding physical data buffer from the physical receiving queue corresponding to said virtual network interface component may comprise:

acquiring the physical buffer control information in the physical receiving queue, the physical buffer control information comprising the physical location information; and the following may be further included after said storing the data according to the physical location information:

marking in the physical control buffer information that data is received, such that a physical machine detects the received data.

For example, the descriptor (i.e., the physical buffer control information) in the corresponding physical receiving queue is read on the physical machine to obtain the information of the physical data buffer. The physical data buffer, which includes the physical location information, is filled during the previous initialization process. After the data is stored, in order for the physical machine to discover that data storing has occurred, a corresponding control bit in the descriptor may be configured to mark that data is received, so that the forwarding program of the physical machine is capable of detecting the received data.

In an embodiment of the present disclosure, for example, it may further comprise: marking, according to the physical buffer control information, in the virtual buffer control information of the virtual receiving queue in the virtual network interface component that data is received, such that the virtual network interface component detects the received data.

In order for the virtual network interface component to detect the received data, when it is detected that the physical buffer control information is marked that data is received, the virtual buffer control information in the virtual receiving queue of the virtual network interface component is also marked to indicate that data is received. For example, the forwarding program discovers that the descriptor (i.e., the physical buffer control information) in the rxq (i.e., the physical receiving queue) is updated and the updated mark shows that there is received packet data. Then after a certain logic check is performed, for example, checking whether the packet length meets a requirement, checking a packet type, and the like, it is determined to send the packet data to the rxq (i.e., the virtual receiving queue) of the virtio-net interface (i.e., the virtual network interface component). The forwarding program then updates the corresponding descriptor (i.e., the virtual buffer control information) of the virtio-net interface, and modifies the state of the corresponding control bit to mark that data is received.

In an embodiment of the present disclosure, for example, the following may be further included: notifying, according to the physical buffer control information, the virtual network interface component that data is received.

Marking that there is received data in the virtual buffer control information in the virtual receiving queue of the virtual network interface component is a passive way to enable the virtual network interface component to detect the received data, as it requires the virtual network interface component to first perform detection on the virtual buffer control information, and only then will it discover that there is received data. Another implementation manner is to directly notify, by means of interruption, the virtual network interface component that data is received. Finally, the virtual network interface component discovers that there is received packet data, and notifies the kernel or APP of the virtual machine to process the data, and the entire receiving process ends.

According to the embodiment of the present disclosure, by allocating one virtual storage space for the virtual network interface component, determining the virtual location information of the multiple virtual data buffers in the virtual storage space, receiving the notification that initialization of the virtual network interface component has been completed, performing detection on the virtual location information in the virtual receiving queue, converting the virtual location information into the physical addresses, determining the physical location information of the physical data buffer according to the physical addresses, acquiring the physical buffer control information in the physical storage space, creating the physical receiving queue of the physical network interface component, adding the physical buffer control information to the physical receiving queue, determining the virtual network interface component to which the data is to be sent according to the data, acquiring the physical location information of the corresponding physical data buffer from the physical receiving queue corresponding to said virtual network interface component, and storing the data according to the physical location information, the present disclosure enables the physical network interface component to directly store, upon receiving data, the received data into a data buffer designated by the virtual network interface component since the physical location information of the physical data buffer of the physical network interface component is designated as the virtual location information instead of being determined via allocation by a physical device, thereby eliminating the process of copying data from a data buffer designated by the physical network interface component to the data buffer designated by the virtual network interface component, which in turn reduces time consumed on receiving data, improves network performance in data receiving, and reduces network latency.

Figure 5:
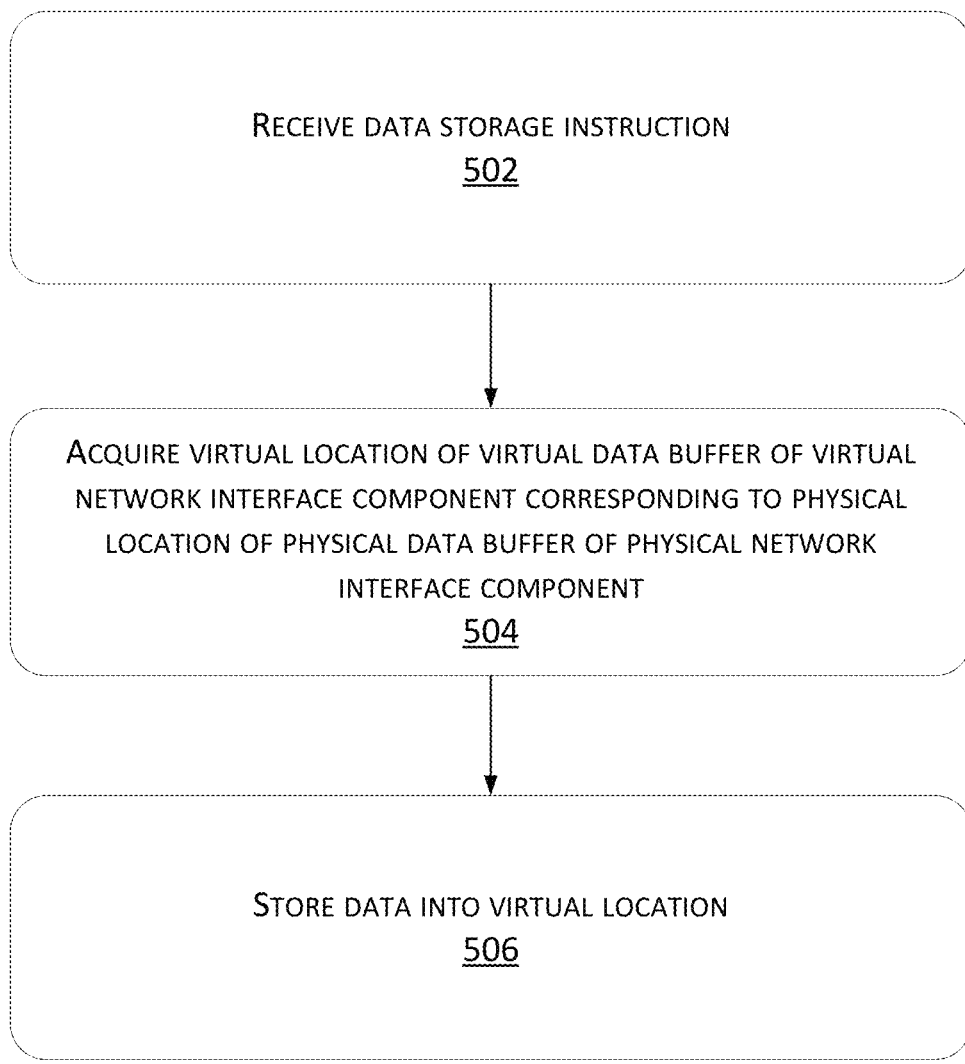
FIG. 5 illustrates a flowchart of an embodiment of a data processing method according to an embodiment of the present disclosure.

Referring to FIG. 5, a flowchart of an embodiment of a data processing method according to an embodiment of the present disclosure is shown. The method may comprise the following steps.

Step 502: receiving a data storage instruction.

In an embodiment of the present disclosure, the data storage instruction is used to store data into a physical location of a physical data buffer of a physical network interface component. The location of the physical data buffer is denoted as the physical location. Accordingly, the location of a virtual data buffer of a virtual network interface component is denoted as a virtual location.

Step 504: acquiring the virtual location of the virtual data buffer of the virtual network interface component corresponding to the physical location of the physical data buffer of the physical network interface component.

In an embodiment of the present disclosure, after the smart network card (i.e., the physical network interface component) implements the vSwitch function and when data is to be stored in a physical data buffer, the smart network card needs to store the data into corresponding physical data buffers for different virtual machines. In order to eliminate the process of copying the received data from a physical data buffer to a virtual data buffer, the physical location of the physical data buffer is directly predesignated as the virtual location of the virtual data buffer of a corresponding virtual machine. After the data storage instruction is received, the virtual location of the virtual data buffer of the virtual network interface component corresponding to the physical location of the physical data buffer of the physical network interface component is acquired.

An implementation manner may include: storing the virtual location of the corresponding virtual machine in the physical location of the physical data buffer of the physical network interface component. When data is stored in the physical location, the corresponding virtual location may be acquired from the physical location. For example, it may include any applicable implementation manner, which is not limited by the embodiments of the present disclosure.

Step 506: storing the data into the virtual location.

In an embodiment of the present disclosure, after the virtual location is acquired, storing the data into the virtual location is performed.

According to the embodiment of the present disclosure, by receiving the data storage instruction, acquiring the virtual location of the virtual data buffer of the virtual network interface component corresponding to the physical location of the physical data buffer of the physical network interface component, and storing the data into the virtual location, the present disclosure enables the physical network interface component to directly store, upon receiving data, the received data into a data buffer designated by the virtual network interface component since the physical location information of the physical data buffer of the physical network interface component is designated as the virtual location information instead of being determined via allocation by a physical device, thereby eliminating the process of copying data from a data buffer designated by the physical network interface component to the data buffer designated by the virtual network interface component, which in turn reduces time consumed on receiving data, improves network performance in data receiving, and reduces network latency.

In order to enable those skilled in the art to better understand the present disclosure, an implementation manner of the present disclosure is described below with a specific example.

Figure 6:
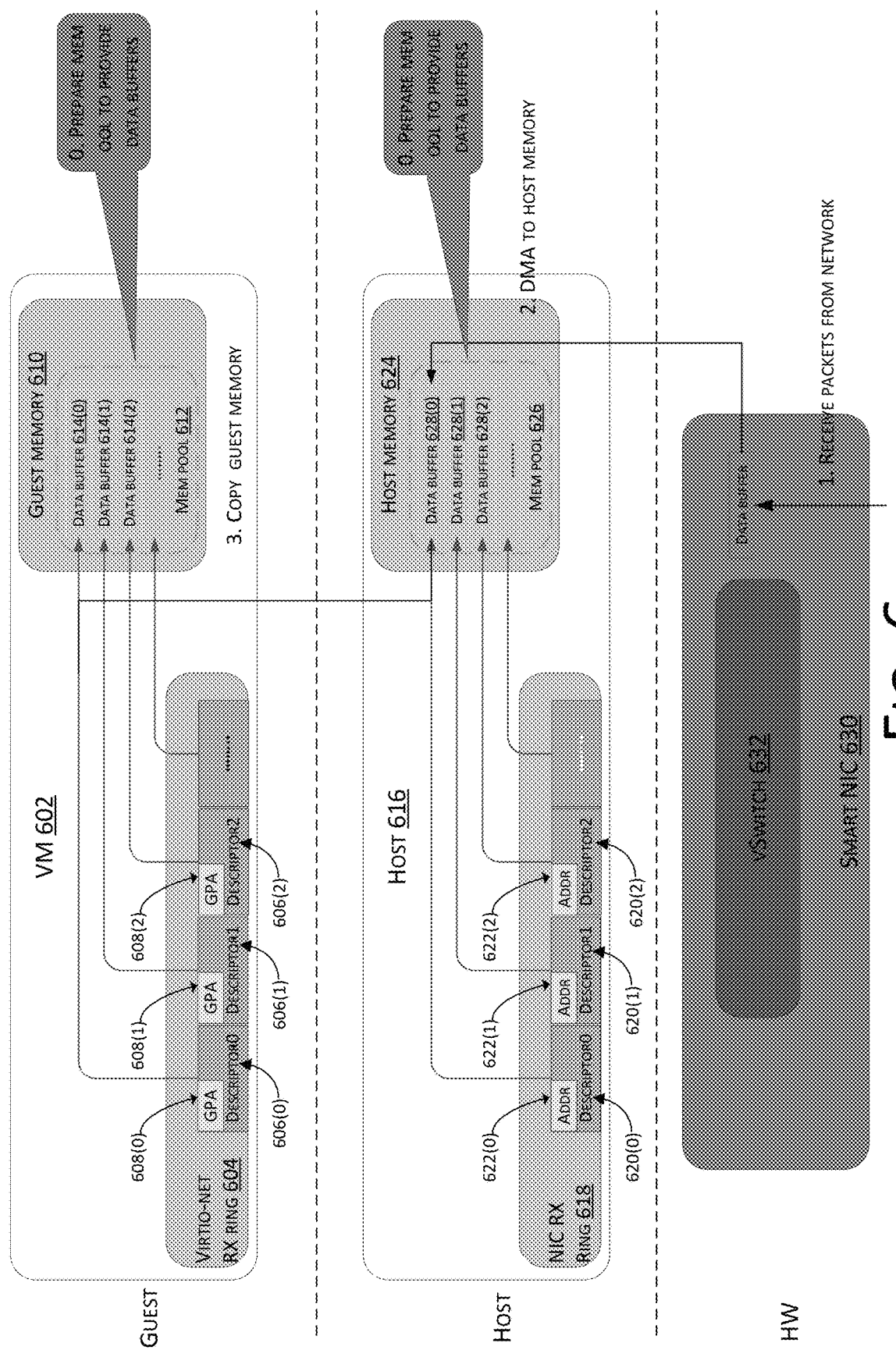
FIG. 6 illustrates a schematic diagram of an unoptimized data buffering process.

FIG. 6 shows a schematic diagram of an unoptimized data buffering process.

Before data is received, initialization of a virtual network interface component and a physical network interface component is performed first.

The virtual network interface component is initialized. The initialization process includes preparing a mem pool used to provide data buffers (i.e., virtual data buffers). In this example, a VM 602 (i.e., a virtual machine) includes a virtio-net RX ring 604 (i.e., a virtual receiving queue), and the element descriptor (virtual buffer control information), such as 606(0), 606(1), 606(2), . . . , in the queue includes GPA (i.e., virtual location information) such as 608(0), 608(1), 608(2). The VM 602 further includes a guest memory 610 (i.e., the storage available to the virtual machine). The mem pool 612 (i.e., the virtual storage space) is allocated in the guest memory 610, and the data buffers 614(0), 614(1), 614(2), . . . , in the mem pool 612 are determined.

The physical network interface component is initialized. The initialization process includes preparing a mem pool used to provide data buffers (i.e., physical data buffers). In this example, a host 616 (i.e., a physical machine) includes a NIC RX ring 618 (i.e., the physical receiving queue), and the element descriptor (physical buffer control information), such as 620(0), 620(1), 620(2) . . . , in the queue includes an Addr (i.e., the physical location information), such as 622(0), 622(1), 622(2), . . . . The host 616 further includes a host memory 624 (i.e., the storage available to the physical machine). The mem pool 626 (i.e., the physical storage space) is allocated in the host memory 624, and the data buffers 628(0), 628(1), 628(2), . . . , in the mem pool 626 are determined.

The process of receiving packet data is as follows.

Step 0: preparing the mem pool to provide data buffers at the host memory 624 and the guest memory 620.

Step 1: a Smart NIC 630 (i.e., the physical network interface component) receiving a packet and storing it in a data buffer on the Smart NIC 630. The Smart NIC 630 includes the function of vSwitch 632.

Step 2: writing the data from the Smart NIC 630 into the host memory 624 by means of DMA. The physical buffer control information in the physical receiving queue is read; according to the physical location information, hardware sends packet data to a designated host memory (i.e., a physical data buffer) by means of DMA; and a corresponding control bit in the descriptor is configured to indicate that network packet data is delivered to the physical receiving queue.

Step 3: copying data from the physical data buffer to a virtual data buffer. A forwarding program on the physical machine discovers that the corresponding descriptor in the virtual receiving queue of virtio-net is updated, that packet data is received, and determines, after a certain logic check, to send it to a certain rxq of virtio-net. The forwarding program reads the corresponding descriptor information in the rxq (i.e., the virtual receiving queue) of the virtio-net interface, and acquires the address of the data buffer in the VM 602. The forwarding program copies data from the data buffer of the host memory 624 to the data buffer of the VM 602, and updates the corresponding control bit of the descriptor (i.e., the virtual buffer control information), and notifies the virtio-net interface, if necessary. Finally, the virtio-net interface sends a notification to the VM 602 that one piece of packet data is received, such that the VM 602 consumes the data, and the entire receiving process ends.

Figure 7:
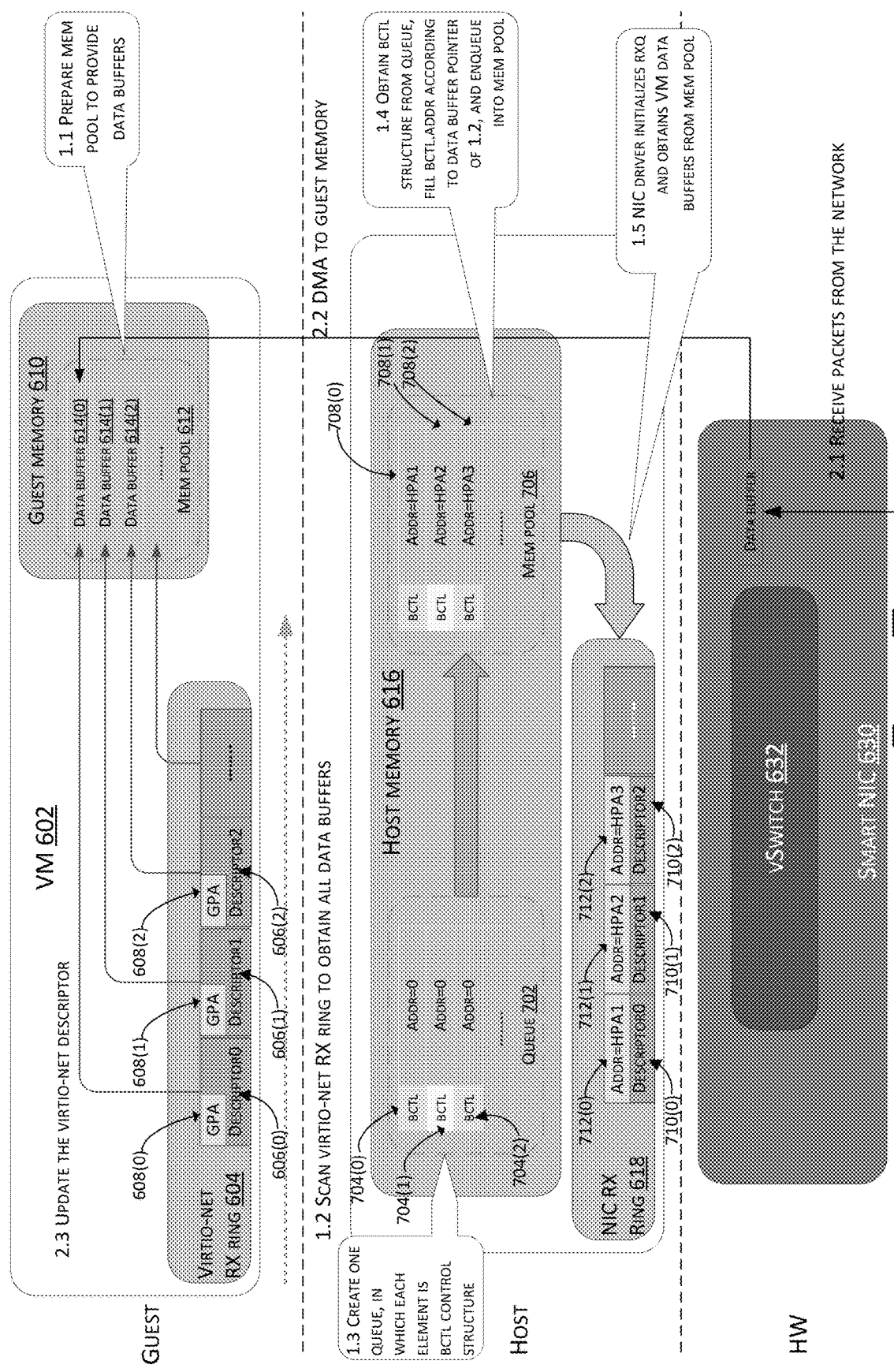
FIG. 7 illustrates a schematic diagram of an optimized data buffering process.

FIG. 7 shows a schematic diagram of an optimized data buffering process.

The initialization process includes the following steps.

Step 1.1: initializing a virtual network interface component. A kernel or APP in a VM 602 prepares one mem pool 612 containing data buffers (i.e., virtual data buffers), such as 614(0), configured to be filled with packet data. A virtio-net interface initializes a rxq virtual receiving queue, and then enables the rxq virtual receiving queue.

Step 1.2: scanning a virtio-net RX ring 604 (i.e., the virtual receiving queue) and acquiring all data buffer pointers (i.e., the virtual location information of the virtual data buffers).

Step 1.3: a forwarding program creating one queue 702, in which each element is one control structure defined as bctl, such as 704(0), 704(1), 704(2), . . . .

Step 1.4: obtaining bctl 704 control structures from the queue 702, filling in bctl.addr (i.e., the physical location information) according to the data buffer pointers acquired in step 1.2, and enqueuing it into the mem pool 706. For example, it includes converting GPA of the data buffers acquired in step 1.2 into HPA, then obtaining a control structure bctl having no data buffers from the queue, setting bctl.addr=HPA, such as 708(0), 708(1), 708(2), . . . , and finally enqueuing it into the mem pool 706. At this point, the data buffers of the mem pool 706 are essentially addresses allocated by the VM 602.

Step 1.5: a driver of a Smart NIC 630 (i.e., the physical network interface component) initializing a rxq (i.e., the physical receiving queue), and acquiring the data buffer pointers (i.e., the virtual location information) of the VM from the mem pool 706 (i.e., the physical storage space). When the forwarding program is initializing the rxq of the NIC network card, dequeuing from the mem pool 706 is performed. The data buffer pointers filled in the descriptors, such as 710(0), 710(1), 710(2), . . . , in the physical receiving queue are actually the data buffer pointers prepared by the VM 602, i.e., addr=HPA, such as 712(0), 712(1), 712(2), . . . The NIC network card completes initialization of the rxq physical receiving queue and enables the rxq physical receiving queue to start receiving network packets.

The data receiving process includes the following steps.

Step 2.1: the Smart NIC 630 (i.e., the physical network interface component) receiving a packet and storing it in a data buffer on the Smart NIC. The Smart NIC 630 includes the function of vSwitch 632. The vSwitch 632 determines to which VM 602 the packet is to be sent according to the header of the packet.

Step 2.2: storing the data in a memory of the VM 602 by means of DMA. The descriptor (i.e., the physical buffer control information), such as 710(0), 710(1), 710(2), . . . , in the physical receiving queue corresponding to the VM 602 is read to obtain the information of the physical data buffer, which is filled during the previous initialization process. Next, hardware sends the packet data to a designated host memory by means of DMA, and configures the corresponding control bit of the descriptor in the physical receiving queue to indicate that network packet data is delivered to the rxq physical receiving queue.

Step 2.3: updating the descriptor (i.e., the virtual buffer control information), such as 606(0), 606(1), 606(2), . . . , in the virtio-net RX ring 604. The forwarding program on the host discovers that the descriptor of the rxq physical receiving queue is updated and that packet data is received, and determines, after a certain logic check, to send it to the rxq (i.e., the virtual receiving queue) of the virtio-net interface. The forwarding program updates the descriptor 606 in the virtio-net RX ring 604 and, if necessary, notifies the virtio-net interface. Ultimately, the virtio-net interface discovers that packet data is received and notifies the virtual machine to consume the data. The entire receiving process ends.

Figure 8:
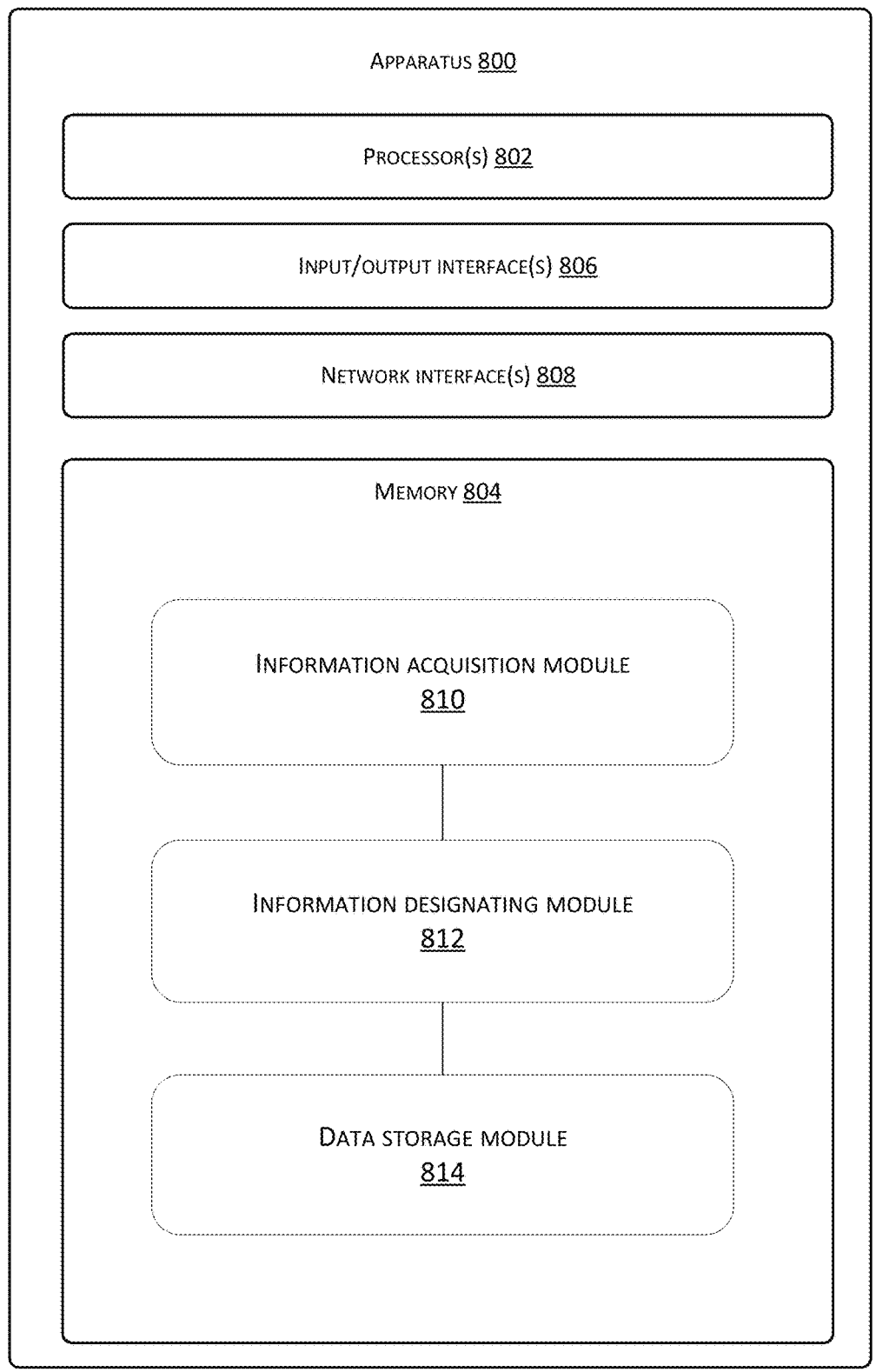
FIG. 8 illustrates a structural block diagram of an embodiment of a data buffering apparatus according to an embodiment of the present disclosure.

Referring to FIG. 8, a structural block diagram of an embodiment of a data buffering apparatus 800 according to an embodiment of the present disclosure.

As shown in FIG. 8, the apparatus 800 includes one or more processor(s) 802 or data processing unit(s) and memory 804. The apparatus 800 may further include one or more input/output interface(s) 806 and one or more network interface(s) 808.

The memory 804 is an example of computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media (transitory media) such as a modulated data signal and carrier.

The memory 804 may store therein a plurality of modules or units including:

an information acquisition module 810, configured to acquire virtual location information of a virtual data buffer of a virtual network interface component;

an information designating module 812, configured to designate physical location information of a physical data buffer of a physical network interface component as the virtual location information; and a data storage module 814, configured to store data according to the virtual location information when the data is being stored into the physical data buffer.

In an embodiment of the present disclosure, for example, the apparatus 800 may further comprise the following modules (not shown in FIG. 8) stored in the memory 804:

a space allocation module, configured to allocate one virtual storage space for the virtual network interface component before said acquiring the virtual location information of the virtual data buffer of the virtual network interface component; and an information determining module, configured to determine virtual location information of multiple virtual data buffers in the virtual storage space.

In an embodiment of the present disclosure, for example, the information determining module comprises:

a virtual queue creation submodule, configured to create a virtual receiving queue of the virtual network interface component, the virtual receiving queue comprising virtual buffer control information;

an information acquisition submodule, configured to acquire, from the virtual storage space, the virtual location information; and an information adding submodule, configured to add the virtual location information to the virtual buffer control information.

In an embodiment of the present disclosure, for example, the information acquisition module comprises:

an information detection submodule configured to perform detection on the virtual location information in the virtual receiving queue.

In an embodiment of the present disclosure, for example, the apparatus further comprises:

a notification receiving module, configured to receive, before said performing detection on the virtual location information in the virtual receiving queue, a notification that the virtual network interface component has been initialized.

In an embodiment of the present disclosure, for example, the information designating module comprises:

an address conversion submodule, configured to convert the virtual location information into physical addresses; and an information determining submodule, configured to determine the physical location information of the physical data buffer according to the physical addresses.

In an embodiment of the present disclosure, for example, the information determining submodule comprises:

an information adding unit, configured to add the physical addresses to physical buffer control information of the physical data buffer.

In an embodiment of the present disclosure, for example, the apparatus 800 may further comprise the following modules (not shown in FIG. 8) stored in the memory 804:

a space creation module, configured to create an information queue composed of the physical buffer control information and create an empty physical storage space before said designating the physical location information of the physical data buffer of the physical network interface component as the virtual location information;

and the information adding unit comprises:

an information acquisition subunit, configured to acquire the physical buffer control information in the information queue; an address adding subunit, configured to add, in sequence, the physical addresses to the acquired physical buffer control information; and an information storing subunit, configured to store the physical buffer control information into the physical storage space.

In an embodiment of the present disclosure, for example, the apparatus 800 may further comprise the following modules (not shown in FIG. 8) stored in the memory 804:

a control information acquisition module, configured to acquire the physical buffer control information in the physical storage space before said storing the data according to the virtual location information when the data is being stored into the physical data buffer;

a physical queue creation module, configured to create the physical receiving queue of the physical network interface component; and a control information adding module, configured to add the physical buffer control information to the physical receiving queue.

In an embodiment of the present disclosure, for example, the virtual network interface component has a one-to-one mapping to the physical receiving queue of the physical network interface component; the physical receiving queue has a one-to-one mapping to the physical data buffer; and the data storage module comprises:

a component determining submodule, configured to determine, according to the data, a virtual network interface component to which the data is to be sent;

a physical information acquisition submodule, configured to acquire, from a physical receiving queue corresponding to said virtual network interface component, physical location information of a corresponding physical data buffer; and a data storing submodule, configured to store the data according to the physical location information.

In an embodiment of the present disclosure, for example, the physical information acquisition submodule comprises:

a physical control information acquisition unit, configured to acquire physical buffer control information in the physical receiving queue, the physical buffer control information comprising the physical location information;

and the apparatus further comprises:

a first marking module, configured to mark, after said storing the data according to the physical location information and in the physical control buffer information, that data is received, such that a physical machine detects the received data.

In an embodiment of the present disclosure, for example, the apparatus 800 may further comprise the following modules (not shown in FIG. 8) stored in the memory 804:

a second marking module, configured to mark, according to the physical buffer control information, in virtual buffer control information of a virtual receiving queue of the virtual network interface component that data is received, such that the virtual network interface component detects the received data.

In an embodiment of the present disclosure, for example, the apparatus 800 may further comprise the following modules (not shown in FIG. 8) stored in the memory 804:

a notification module, configured to notify, according to the physical buffer control information, the virtual network interface component that data is received. According to the embodiments of the present disclosure, by acquiring virtual location information of a virtual data buffer of a virtual network interface component, designating physical location information of a physical data buffer of a physical network interface component as the virtual location information, and storing the data according to the virtual location information when the data is being stored into the physical data buffer, the present disclosure enables the physical network interface component to directly store, upon receiving data, the received data into a data buffer designated by the virtual network interface component since the physical location information of the physical data buffer of the physical network interface component is designated as the virtual location information instead of being determined via allocation by a physical device, thereby eliminating the process of copying data from a data buffer designated by the physical network interface component to the data buffer designated by the virtual network interface component, which in turn reduces time consumed on receiving data, improves network performance in data receiving, and reduces network latency.

Figure 9:
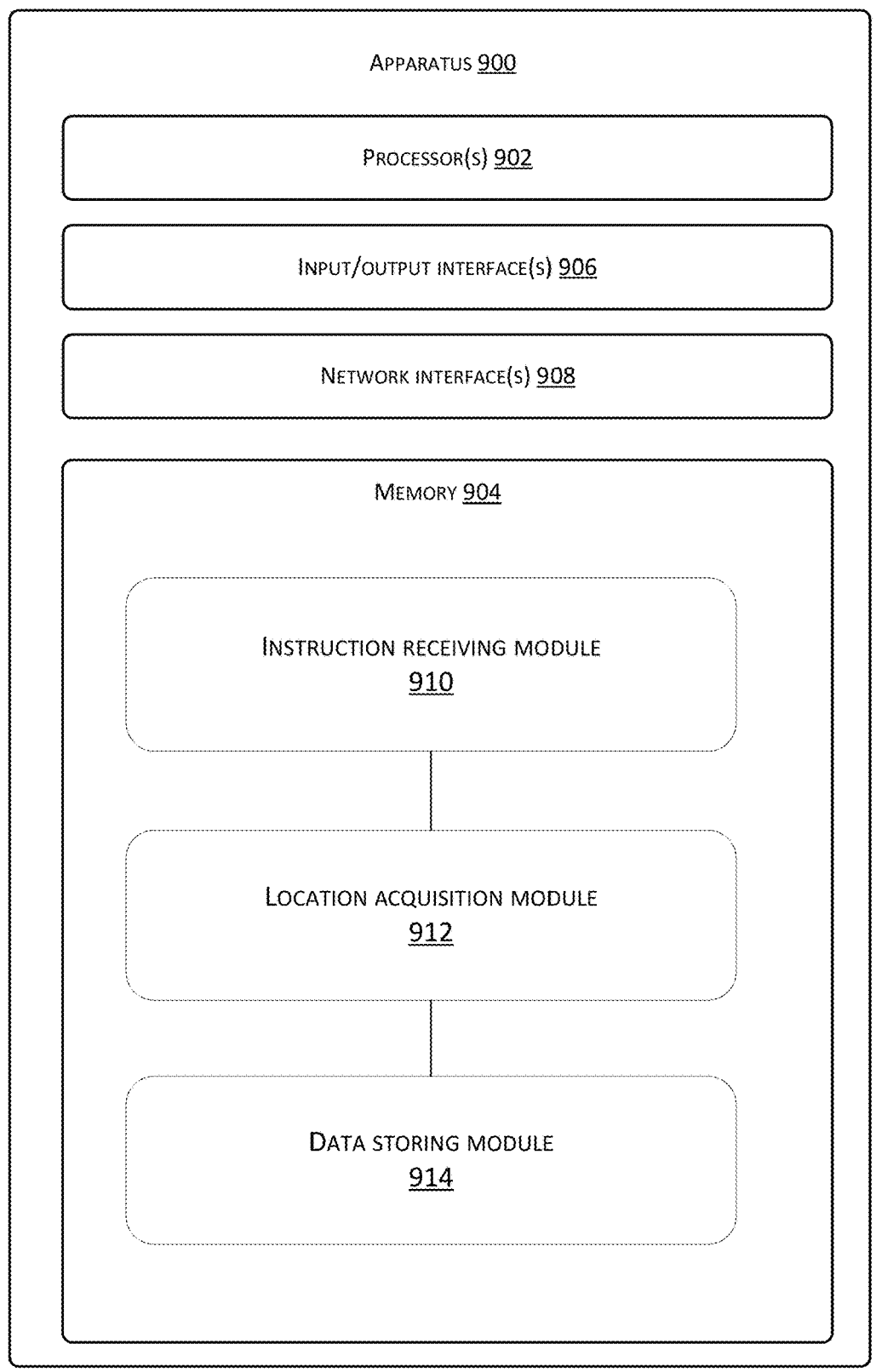
FIG. 9 illustrates a structural block diagram of an embodiment of a data buffering apparatus according to an embodiment of the present disclosure.

Referring to FIG. 9, a structural block diagram of a data processing apparatus 900 according to an embodiment of the present disclosure is shown.

As shown in FIG. 9, the apparatus 900 includes one or more processor(s) 902 or data processing unit(s) and memory 904. The apparatus 900 may further include one or more input/output interface(s) 906 and one or more network interface(s) 908.

The memory 904 may store therein a plurality of modules or units including:

an instruction receiving module 910, configured to receive a data storage instruction, wherein the data storage instruction is used to store data into a physical location of a physical data buffer of a physical network interface component;

a location acquisition module 912, configured to acquire a virtual location of a virtual data buffer of a virtual network interface component corresponding to the physical location of the physical data buffer of the physical network interface component; and a data storing module 914, configured to store the data into the virtual location.

According to the embodiment of the present disclosure, by receiving the data storage instruction, acquiring the virtual location of the virtual data buffer of the virtual network interface component corresponding to the physical location of the physical data buffer of the physical network interface component, and storing the data into the virtual location, the present disclosure enables the physical network interface component to directly store, upon receiving data, the received data into a data buffer designated by the virtual network interface component since the physical location information of the physical data buffer of the physical network interface component is designated as the virtual location information instead of being determined via allocation by a physical device, thereby eliminating the process of copying data from a data buffer designated by the physical network interface component to the data buffer designated by the virtual network interface component, which in turn reduces time consumed on receiving data, improves network performance in data receiving, and reduces network latency.

Since the apparatus embodiments are basically similar to the method embodiments, they are described in a more concise manner. For relevant content, reference may be made to the description of the method embodiments.

Figure 10:
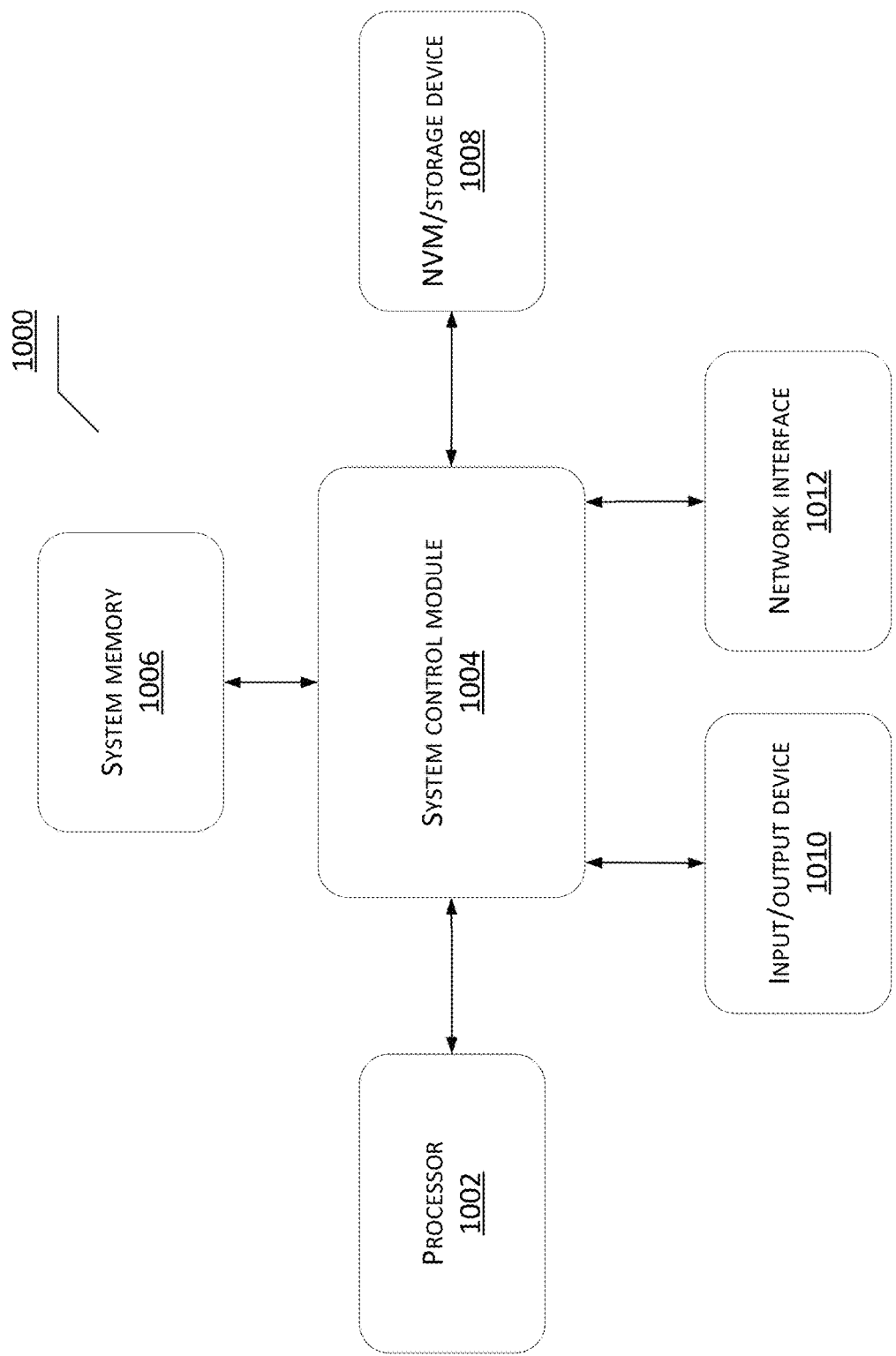
FIG. 10 illustrates an example system that may be used to implement various embodiments described in the present disclosure.

The embodiments of the present disclosure may be implemented as a system that uses any suitable hardware, firmware, software, or any combination thereof to form a desired configuration. FIG. 10 schematically shows an example system (or apparatus) 600 that may be used to implement various embodiments described in the present disclosure.

For one embodiment, FIG. 10 shows an example system 600 having one or more processors 1002, a system control module (chipset) 1004 coupled to at least one of the (one or more) processor(s) 1002, a system memory 1006 coupled to the system control module 1004, a non-volatile memory (NVM)/storage apparatus 1008 coupled to the system control module 1004, one or more input/output apparatuses 1010 coupled to the system control module 1004, and a network interface 1012 coupled to system control module 1004.

The processor(s) 1002 may comprise one or more single-core or multi-core processors, and the processor(s) 1002 may include any combination of general-purpose processor(s) or dedicated processor(s) (for example, a graphics processing unit, an application processor, a baseband processor, and the like). In some embodiments, the system 600 can serve as a browser.

In some embodiments, the system 600 may comprise one or more computer-readable media having instructions (for example, the system memory 1006 or the NVM/storage apparatus 1008) and the one or more processors 1002 compatible with the one or more computer-readable media and configured to execute the instructions to implement modules, and accordingly perform the actions described in the present disclosure.

For one embodiment, the system control module 1004 may comprise any suitable interface controller to provide any suitable interface to at least one of the (one or more) processor(s) 1002 and/or any suitable apparatus or component communicating with the system control module 1004.

The system control module 1004 may comprise a memory controller module to provide an interface to the system memory 1006. The memory controller module may be a hardware module, a software module, and/or a firmware module.

The system memory 1006 may be used to load and store data and/or instructions for the system 600, for example. For one embodiment, the system memory 1006 may comprise any suitable volatile memory, for example, a suitable DRAM. In some embodiments, the system memory 1006 may comprise a double-data-rate fourth generation synchronous dynamic random-access memory (DDR4 SDRAM).

For one embodiment, the system control module 1004 may comprise one or more input/output controllers to provide an interface to the NVM/storage apparatus 1008 and the (one or more) input/output apparatus(es) 1010.

For example, the NVM/storage apparatus 1008 may be used to store data and/or instructions. The NVM/storage apparatus 1008 may comprise any suitable non-volatile memory (for example, flash memory) and/or may include any suitable (one or more) non-volatile storage apparatus(es) (for example, one or more hard disk drives (HDD), one or more compact disc (CD) drives, and/or one or more digital versatile disc (DVD) drives).

The NVM/storage apparatus 1008 may comprise storage resources that are physically part of the apparatus on which the system 600 is installed, or may be accessible for the apparatus without necessarily being part of the apparatus. For example, the NVM/storage apparatus 1008 may be accessed by the (one or more) input/output apparatus(es) 1010 via a network.

The (one or more) input/output apparatus(es) 1010 may provide an interface to the system 600 to communicate with any other suitable apparatus. The input/output apparatus(es) 1010 may comprise a communication component, audio component, sensor component, and the like. The network interface 1012 may provide an interface to the system 600 to communicate via one or more networks, and the system 600 may perform wireless communication with one or more components in a wireless network according to any of one or more wireless network standards and/or protocols, for example, by accessing a communication standard-based wireless network, such as Wi-Fi, 2G, 3G, or a combination thereof to perform wireless communication.

For one embodiment, at least one of the (one or more) processor(s) 1002 may be packaged with the logic of one or more controllers (for example, the memory controller module) of the system control module 1004. For one embodiment, at least one of the (one or more) processor(s) 1002 may be packaged with the logic of one or more controllers of the system control module 1004 to form a system-in-package (SiP). For one embodiment, at least one of the (one or more) processor(s) 1002 may be integrated with the logic of one or more controllers of the system control module 1004 on the same mold. For one embodiment, at least one of the (one or more) processor(s) 1002 may be integrated with the logic of one or more controllers of the system control module 1004 on the same mold to form a system-on-chip (SoC).

In various embodiments, the system 600 may be, but not limited to, a browser, workstation, desktop computing apparatus, or mobile computing apparatus (for example, laptop computing apparatus, hand-held computing apparatus, a tablet computer, a netbook, and the like). In various embodiments, the system 600 may have more or fewer components and/or different architectures. For example, in some embodiments, the system 600 comprises one or more cameras, keyboards, liquid crystal display (LCD) screens (comprising touch screen displays), non-volatile memory ports, multiple antennas, graphics chips, application-specific integrated circuits (ASIC), and speakers, wherein if the display comprises a touch panel, the display screen may be implemented as a touch screen display to receive input signals from users. The touch panel comprises one or more touch sensors to sense a touch, swipe, and gesture on the touch panel. The touch sensor may not only sense the boundary of a touch or swipe action, but also detect the duration and pressure related to the touch or swipe operation.

An embodiment of the present disclosure further provides a non-volatile readable storage medium, where one or more modules (programs) are stored therein, and applying the one or more modules at a terminal apparatus enables the terminal apparatus to execute instructions of each method step in an embodiments of the present disclosure.

An example provides a computer device, comprising a memory, a processor, and a computer program stored on the memory and executable on the processor; and the processor performs the method(s) as described in an embodiments of the present disclosure when executing the computer program.

An example further provides a computer-readable storage medium having a computer program stored thereon, and the program implements one or more of the methods described in an embodiments of the present disclosure when being executed by a processor.

The embodiments of the present disclosure disclose a data buffering method and apparatus. Example 1 includes a data buffering method, comprising:

acquiring virtual location information of virtual data buffers of a virtual network interface component;

designating physical location information of a physical data buffer of a physical network interface component as the virtual location information; and storing data according to the virtual location information when the data is being stored into the physical data buffer.

Example 2 may include the method described in Example 1, and before said acquiring the virtual location information of the virtual data buffers of the virtual network interface component, the method further comprises:

allocating a virtual storage space for the virtual network interface component; and determining virtual location information of multiple virtual data buffers in the virtual storage space.

Example 3 may include the method of Example 1 and/or Example 2, wherein said determining the virtual location information of the multiple virtual data buffers in the virtual storage space comprises:

creating a virtual receiving queue of the virtual network interface component, the virtual receiving queue comprising virtual buffer control information;

acquiring, from the virtual storage space, the virtual location information; and adding the virtual location information to the virtual buffer control information.

Example 4 may include the method described in one or more of Examples 1 to 3, wherein said acquiring the virtual location information of the data buffers of the virtual network interface component comprises:

performing detection on the virtual location information in the virtual receiving queue.

Example 5 may include the method described in one or more of Examples 1 to 4, wherein before said performing detection on the virtual location information in the virtual receiving queue, the method further comprises:

receiving a notification that initialization of the virtual network interface component is completed.

Example 6 may include the method described in one or more of Examples 1 to 5, wherein said designating the physical location information of the physical data buffer of the physical network interface component as the virtual location information comprises:

converting the virtual location information into physical addresses; and determining, according to the physical addresses, the physical location information of the physical data buffer.

Example 7 may include the method described in one or more of Examples 1 to 6, wherein said determining, according to the physical addresses, the physical location information of the physical data buffer comprises:

adding the physical addresses to physical buffer control information of the physical data buffer.

Example 8 may include the method described in one or more of Examples 1 to 7, wherein before said designating the physical location information of the physical data buffer of the physical network interface component as the virtual location information, the method further comprises:

creating an information queue composed of the physical buffer control information, and creating an empty physical storage space;

said adding the physical addresses to the physical buffer control information of the physical data buffer comprises:

acquiring the physical buffer control information in the information queue;

adding, in sequence, the physical addresses to the acquired physical buffer control information; and storing the physical buffer control information into the physical storage space.

Example 9 may include the method described in one or more of Examples 1 to 8, wherein before said storing the data according to the virtual location information when the data is being stored into the physical data buffer, the method further comprises:

acquiring the physical buffer control information in the physical storage space;

creating a physical receiving queue of the physical network interface component; and adding the physical buffer control information to the physical receiving queue.

Example 10 may include the method described in one or more of Examples 1 to 9, wherein the virtual network interface component has a one-to-one mapping to the physical receiving queue of the physical network interface component, the physical receiving queue has a one-to-one mapping to the physical data buffer; and said storing the data according to the virtual location information when the data is being stored into the physical data buffer comprises:

determining, according to the data, a virtual network interface component to which the data is to be sent;

acquiring, from a physical receiving queue corresponding to said virtual network interface component, physical location information of a corresponding physical data buffer; and storing the data according to the physical location information.

Example 11 may include the method described in one or more of Examples 1 to 10, wherein said acquiring, from the physical receiving queue corresponding to said virtual network interface component, physical location information of the corresponding physical data buffer comprises:

acquiring the physical buffer control information in the physical receiving queue, the physical buffer control information comprising the physical location information; and after said storing the data according to the physical location information, the method further comprises:

marking, in the physical control buffer information, that data is received, such that a physical machine detects the received data.

Example 12 may include the method described in one or more of Examples 1 to 11, and the method further comprises:

marking, according to the physical buffer control information, in the virtual buffer control information of the virtual receiving queue in the virtual network interface component that data is received, such that the virtual network interface component detects the received data.

Example 13 may include the method described in one or more of Examples 1 to 12, and the method further comprises:

notifying, according to the physical buffer control information, the virtual network interface component that data is received.

Example 14 includes a data processing method, comprising:

receiving a data storage instruction, wherein the data storage instruction is used to store data into a physical location of a physical data buffer of a physical network interface component;

acquiring a virtual location of a virtual data buffer of a virtual network interface component corresponding to the physical location of the physical data buffer of the physical network interface component; and storing the data into the virtual location.

Example 15 includes a data buffering apparatus, comprising:

an information acquisition module, configured to acquire virtual location information of virtual data buffers of a virtual network interface component;

an information designating module, configured to designate physical location information of a physical data buffer of a physical network interface component as the virtual location information; and a data storage module configured to store data according to the virtual location information when the data is being stored into the physical data buffer.

Example 16 may include the apparatus described in Example 15, and the apparatus further comprises:

a space allocation module, configured to allocate one virtual storage space for the virtual network interface component before said acquiring the virtual location information of the virtual data buffer of the virtual network interface component; and an information determining module, configured to determine virtual location information of multiple virtual data buffers in the virtual storage space.

Example 17 may include the apparatus described in Example 15 and/or Example 16, wherein the information determining module comprises:

a virtual queue creation submodule, configured to create a virtual receiving queue of the virtual network interface component, the virtual receiving queue comprising virtual buffer control information;

an information acquisition submodule, configured to acquire, from the virtual storage space, the virtual location information; and an information adding submodule, configured to add the virtual location information to the virtual buffer control information.

Example 18 may include the apparatus described in one or more of Examples 15 to 17, wherein the information acquisition module comprises:

an information detection submodule configured to perform detection on the virtual location information in the virtual receiving queue.

Example 19 may include the apparatus described in one or more of Examples 15 to 18, and the apparatus further comprises:

a notification receiving module, configured to receive, before said performing detection on the virtual location information in the virtual receiving queue, a notification that the virtual network interface component has been initialized.

Example 20 may include the apparatus described in one or more of Examples 15 to 19, wherein the information designating module comprises:

an address conversion submodule, configured to convert the virtual location information into physical addresses; and an information determining submodule, configured to determine the physical location information of the physical data buffer according to the physical addresses.

Example 21 may include the apparatus described in one or more of Examples 15 to 20, wherein the information determining submodule comprises:

an information adding unit, configured to add the physical addresses to physical buffer control information of the physical data buffer.

Example 22 may include the apparatus described in one or more of Examples 15 to 21, and the apparatus further comprises:

a space creation module, configured to create an information queue composed of the physical buffer control information and create an empty physical storage space before said designating the physical location information of the physical data buffer of the physical network interface component as the virtual location information;

and the information adding unit comprises:

an information acquisition subunit, configured to acquire the physical buffer control information in the information queue;

an address adding subunit, configured to add the physical addresses to physical buffer control information of the physical data buffer; and an information storing subunit, configured to store the physical buffer control information into the physical storage space.

Example 23 may include the apparatus described in one or more of Examples 15 to 22, and the apparatus further comprises:

a control information acquisition module, configured to acquire the physical buffer control information in the physical storage space before said storing the data according to the virtual location information when the data is being stored into the physical data buffer;

a physical queue creation module, configured to create the physical receiving queue of the physical network interface component; and a control information adding module, configured to add the physical buffer control information to the physical receiving queue.

Example 24 may include the apparatus described in one or more of Examples 15 to 23, wherein the virtual network interface component has a one-to-one mapping to the physical receiving queue of the physical network interface component, the physical receiving queue has a one-to-one mapping to the physical data buffer; and the data storage module comprises:

a component determining submodule, configured to determine, according to the data, a virtual network interface component to which the data is to be sent;

a physical information acquisition submodule, configured to acquire, from a physical receiving queue corresponding to said virtual network interface component, physical location information of a corresponding physical data buffer; and a data storing submodule, configured to store the data according to the physical location information.

Example 25 may include the apparatus described in one or more of Examples 15 to 24, wherein the physical information acquisition submodule comprises:

a physical control information acquisition unit, configured to acquire physical buffer control information in the physical receiving queue, the physical buffer control information comprising the physical location information;

and the apparatus further comprises:

a first marking module, configured to mark, after said storing the data according to the physical location information and in the physical control buffer information, that data is received, such that a physical machine detects the received data.

Example 26 may include the apparatus described in one or more of Examples 15 to 25, and the apparatus further comprises:

a second marking module, configured to mark, according to the physical buffer control information, in virtual buffer control information of a virtual receiving queue of the virtual network interface component that data is received, such that the virtual network interface component detects the received data.

Example 27 may include the apparatus described in one or more of Examples 15 to 26, and the apparatus further comprises:

a notification module, configured to notify, according to the physical buffer control information, the virtual network interface component that data is received.

Example 28 includes a data processing apparatus, comprising:

an instruction receiving module, configured to receive a data storage instruction, wherein the data storage instruction is used to store data into a physical location of a physical data buffer of a physical network interface component;

a location acquisition module, configured to acquire a virtual location of a virtual data buffer of a virtual network interface component corresponding to the physical location of the physical data buffer of the physical network interface component; and a data storing module, configured to store the data into the virtual location.

Example 29 includes a computer device, comprising a memory, a processor, and a computer program stored on the memory and executable on the processor, wherein the processor implements the method of one or more of Examples 1-14 when executing the computer program.

Example 30 includes a computer-readable storage medium having a computer program stored thereon, and the program implements the method of one or more of Examples 1-14 when being executed by a processor.

Although some embodiments are for illustrative and descriptive purposes, various alternative and/or equivalent implementation manners or calculations used to achieve the same purposes of illustrating and describing the objective embodiments do not depart from the scope of implementation of the present disclosure. The present disclosure is intended to cover any modifications or changes of the embodiments discussed herein. Therefore, it is apparent that the embodiments described herein are limited only by the claims and the equivalents thereof.

The present disclosure may further be understood with clauses as follows.

Clause 1. A data buffering method comprising:

acquiring virtual location information of virtual data buffers of a virtual network interface component;

designating physical location information of a physical data buffer of a physical network interface component as the virtual location information; and storing data according to the virtual location information when storing the data into the physical data buffer.

Clause 2. The method according to clause 1, wherein before the acquiring virtual location information of virtual data buffers of a virtual network interface component, the method further comprises:

allocating a virtual storage space for the virtual network interface component; and determining virtual location information of multiple virtual data buffers in the virtual storage space.

Clause 3. The method according to clause 2, wherein the determining the virtual location information of the multiple virtual data buffers in the virtual storage space comprises:

creating a virtual receiving queue of the virtual network interface component, the virtual receiving queue comprising virtual buffer control information;

acquiring, from the virtual storage space, the virtual location information; and adding the virtual location information to the virtual buffer control information.

Clause 4. The method according to clause 3, wherein the acquiring the virtual location information of data buffers of the virtual network interface component comprises:

performing detection on the virtual location information in the virtual receiving queue.

Clause 5. The method according to clause 4, wherein before the performing detection on the virtual location information in the virtual receiving queue, the method further comprises:

receiving a notification that initialization of the virtual network interface component is completed.

Clause 6. The method according to clause 1, wherein the designating the physical location information of the physical data buffer of the physical network interface component as the virtual location information comprises:

converting the virtual location information into a physical addresses; and determining, according to the physical addresses, the physical location information of the physical data buffer.

Clause 7. The method according to clause 6, wherein the determining, according to the physical addresses, the physical location information of the physical data buffer comprises:

adding the physical addresses to physical buffer control information of the physical data buffer.

Clause 8. The method according to clause 7, wherein:
before the designating the physical location information of the physical data buffer of the physical network interface component as the virtual location information, the method further comprises:
creating an information queue composed of the physical buffer control information, and creating and an empty physical storage space; and
the adding the physical addresses to the physical buffer control information of the physical data buffer comprises:
acquiring the physical buffer control information in the information queue;
adding, in sequence, the physical addresses to the acquired physical buffer control information; and
storing the physical buffer control information into the physical storage space.

Clause 9. The method according to clause 8, wherein before the storing the data according to the virtual location information when storing the data into the physical data buffer, the method further comprises:
acquiring the physical buffer control information in the physical storage space;
creating a physical receiving queue of the physical network interface component; and
adding the physical buffer control information to the physical receiving queue.

Clause 10. The method according to clause 1, wherein:
the virtual network interface component has a one-to-one mapping to the physical receiving queue of the physical network interface component;
the physical receiving queue has a one-to-one mapping to the physical data buffer; and
the storing data according to the virtual location information when storing the data into the physical data buffer comprises:
determining, according to the data, a virtual network interface component to which the data is to be sent;
acquiring, from a physical receiving queue corresponding to the virtual network interface component, physical location information of a corresponding physical data buffer; and
storing the data according to the physical location information.

Clause 11. The method according to clause 10, wherein:
the acquiring, from the physical receiving queue corresponding to the virtual network interface component, the physical location information of the corresponding physical data buffer comprises:
acquiring the physical buffer control information in the physical receiving queue, the physical buffer control information comprising the physical location information; and
after the storing the data according to the physical location information, the method further comprises:
marking in the physical control buffer information that the data is received, such that a physical machine detects the received data.

Clause 12. The method according to clause 11, further comprising:
marking, according to the physical buffer control information, in the virtual buffer control information of the virtual receiving queue in the virtual network interface component that data is received, such that the virtual network interface component detects the received data.

Clause 13. The method according to clause 11, further comprising:
notifying, according to the physical buffer control information, the virtual network interface component that the data is received.

Clause 14. A data processing method comprising:
receiving a data storage instruction, wherein the data storage instruction is used to store data into a physical location of a physical data buffer of a physical network interface component;
acquiring a virtual location of a virtual data buffer of a virtual network interface component corresponding to the physical location of the physical data buffer of the physical network interface component; and
storing the data into the virtual location.

Clause 15. A computer device, comprising a memory, a processor, and a computer program stored on the memory and executable on the processor, wherein the processor implements the method according to one or more of clauses 1-14 when executing the computer program.

Clause 16. A computer-readable storage medium having a computer program stored thereon, wherein the computer program implements the method according to one or more of clauses 1-14 when being executed by a processor.

What is claimed is:
1. A method comprising:
acquiring virtual location information of a virtual data buffer of a virtual network interface component;
creating an information queue composed of physical buffer control information;
creating a physical storage space;
designating physical location information of a physical data buffer of a physical network interface component as the virtual location information, without copying data from the physical data buffer to the virtual data buffer, the act of designating the physical location information including:
converting the virtual location information into a physical address; and
determining, according to the physical address, the physical location information of the physical data buffer, the act of determining the physical location information including adding the physical address to the physical buffer control information of the physical data buffer;
acquiring the physical buffer control information in the physical storage space;
creating a physical receiving queue of the physical network interface component, the physical receiving queue having a one-to-one mapping to the physical data buffer;
adding the physical buffer control information to the physical receiving queue;
storing data according to the virtual location information in response to storing the data into the physical data buffer, the act of storing including:
determining, according to the data, a virtual network interface component to which the data is to be sent;
acquiring, from the physical receiving queue corresponding to the virtual network interface component, the physical location information of the physical data buffer, the act of acquiring the physical location information including acquiring the physical buffer control information in the physical receiving queue, the physical buffer control information including the physical location information; and
storing the data according to the physical location information;
marking in the physical buffer control information that the data is received; and notifying, according to the physical buffer control information, the virtual network interface component that the data is received.

2. The method according to claim 1, wherein before the acquiring the virtual location information of the virtual data buffer of the virtual network interface component, the method further comprises:
- allocating a virtual storage space for the virtual network interface component; and
- determining virtual location information of multiple virtual data buffers in the virtual storage space.

3. The method according to claim 2, wherein the determining the virtual location information of the multiple virtual data buffers in the virtual storage space comprises:
- creating a virtual receiving queue of the virtual network interface component, the virtual receiving queue comprising virtual buffer control information;
- acquiring, from the virtual storage space, the virtual location information; and
- adding the virtual location information to the virtual buffer control information.

4. The method according to claim 3, wherein the acquiring the virtual location information of the virtual data buffer of the virtual network interface component comprises:
- performing detection on the virtual location information in the virtual receiving queue.

5. The method according to claim 4, wherein before the performing detection on the virtual location information in the virtual receiving queue, the method further comprises:
- receiving a notification that initialization of the virtual network interface component is completed.

6. The method according to claim 1, wherein the adding the physical address to the physical buffer control information of the physical data buffer comprises:
- acquiring the physical buffer control information in the information queue;
- adding, in sequence, the physical address to the acquired physical buffer control information; and
- storing the physical buffer control information into the physical storage space.

7. The method according to claim 1, wherein the creating the physical storage space comprises creating an empty physical storage space.

8. An apparatus comprising:
- one or more processors; and
- one or more memories storing thereon computer-readable instructions that, when executed by the one or more processors, cause the one or more processors to perform acts comprising:
  - acquiring virtual location information of a virtual data buffer of a virtual network interface component;
  - creating an information queue composed of physical buffer control information;
  - creating a physical storage space;
  - designating physical location information of a physical data buffer of a physical network interface component as the virtual location information, without copying data from the physical data buffer to the virtual data buffer, the act of designating the physical location information including:
    - converting the virtual location information into a physical address; and
    - determining, according to the physical address, the physical location information of the physical data buffer, the act of determining the physical location information including adding the physical address to the physical buffer control information of the physical data buffer;
  - acquiring the physical buffer control information in the physical storage space;
  - creating a physical receiving queue of the physical network interface component, the physical receiving queue having a one-to-one mapping to the physical data buffer;
  - adding the physical buffer control information to the physical receiving queue;
  - storing data according to the virtual location information in response to storing the data into the physical data buffer, the act of storing including:
    - determining, according to the data, a virtual network interface component to which the data is to be sent;
    - acquiring, from the physical receiving queue corresponding to the virtual network interface component, the physical location information of the physical data buffer, the act of acquiring the physical location information including acquiring the physical buffer control information in the physical receiving queue, the physical buffer control information including the physical location information; and
    - storing the data according to the physical location information;
  - marking in the physical buffer control information that the data is received; and
  - notifying, according to the physical buffer control information, the virtual network interface component that the data is received.

9. The apparatus according to claim 8, wherein before the acquiring the virtual location information of the virtual data buffer of the virtual network interface component, the acts further comprise:
- allocating a virtual storage space for the virtual network interface component; and
- determining virtual location information of multiple virtual data buffers in the virtual storage space.

10. The apparatus according to claim 9, wherein the determining the virtual location information of the multiple virtual data buffers in the virtual storage space comprises:
- creating a virtual receiving queue of the virtual network interface component, the virtual receiving queue comprising virtual buffer control information;
- acquiring, from the virtual storage space, the virtual location information; and
- adding the virtual location information to the virtual buffer control information.

11. The apparatus according to claim 10, wherein the acquiring the virtual location information of the virtual data buffer of the virtual network interface component comprises:
- performing detection on the virtual location information in the virtual receiving queue.

12. The apparatus according to claim 11, wherein before the performing detection on the virtual location information in the virtual receiving queue, the acts further comprise:
- receiving a notification that initialization of the virtual network interface component is completed.

13. The apparatus according to claim 8, wherein the adding the physical address to the physical buffer control information of the physical data buffer comprises:
- acquiring the physical buffer control information in the information queue;
- adding, in sequence, the physical address to the acquired physical buffer control information; and storing the physical buffer control information into the physical storage space.

14. The apparatus according to claim 8, wherein the creating the physical storage space comprises creating an empty physical storage space.

15. One or more memories storing thereon computer-readable instructions that, when executed by one or more processors, cause the one or more processors to perform acts comprising:
acquiring virtual location information of a virtual data buffer of a virtual network interface component;
creating an information queue composed of physical buffer control information;
creating a physical storage space;
designating physical location information of a physical data buffer of a physical network interface component as the virtual location information, without copying data from the physical data buffer to the virtual data buffer, the act of designating the physical location information including:
converting the virtual location information into a physical address; and
determining, according to the physical address, the physical location information of the physical data buffer, the act of determining the physical location information including adding the physical address to the physical buffer control information of the physical data buffer;
acquiring the physical buffer control information in the physical storage space;
creating a physical receiving queue of the physical network interface component, the physical receiving queue having a one-to-one mapping to the physical data buffer;
adding the physical buffer control information to the physical receiving queue;
storing data according to the virtual location information in response to storing the data into the physical data buffer, the act of storing including:
determining, according to the data, a virtual network interface component to which the data is to be sent;
acquiring, from the physical receiving queue corresponding to the virtual network interface component, the physical location information of the physical data buffer, the act of acquiring the physical location information including acquiring the physical buffer control information in the physical receiving queue, the physical buffer control information including the physical location information; and
storing the data according to the physical location information;
marking in the physical buffer control information that the data is received; and
notifying, according to the physical buffer control information, the virtual network interface component that the data is received.

16. The one or more memories according to claim 15, wherein before the acquiring the virtual location information of the virtual data buffer of the virtual network interface component, the acts further comprise:
allocating a virtual storage space for the virtual network interface component; and
determining virtual location information of multiple virtual data buffers in the virtual storage space.

17. The one or more memories according to claim 16, wherein the determining the virtual location information of the multiple virtual data buffers in the virtual storage space comprises:
creating a virtual receiving queue of the virtual network interface component, the virtual receiving queue comprising virtual buffer control information;
acquiring, from the virtual storage space, the virtual location information; and
adding the virtual location information to the virtual buffer control information.

18. The one or more memories according to claim 17, wherein the acquiring the virtual location information of the virtual data buffer of the virtual network interface component comprises:
performing detection on the virtual location information in the virtual receiving queue.

19. The one or more memories according to claim 18, wherein before the performing detection on the virtual location information in the virtual receiving queue, the acts further comprise:
receiving a notification that initialization of the virtual network interface component is completed.

20. The one or more memories according to claim 15, wherein the adding the physical address to the physical buffer control information of the physical data buffer comprises:
acquiring the physical buffer control information in the information queue;
adding, in sequence, the physical address to the acquired physical buffer control information; and
storing the physical buffer control information into the physical storage space.

* * * * *